United States Patent
Pandit et al.

(10) Patent No.: US 10,942,813 B2
(45) Date of Patent: Mar. 9, 2021

(54) CLOUD OBJECT DATA LAYOUT (CODL)

(71) Applicant: NetApp, Inc., Sunnyvale, CA (US)

(72) Inventors: Atul Ramesh Pandit, San Jose, CA (US); Michael R. Eisler, Colorado Springs, CO (US); Sisir Shekhar, Bihar (IN); Vijay Mohan Deshmukh, Fremont, CA (US)

(73) Assignee: NETAPP, INC., Sunnyvale, CA (US)

( * ) Notice: Subject to any disclaimer, the term of this patent is extended or adjusted under 35 U.S.C. 154(b) by 784 days.

(21) Appl. No.: 14/929,091

(22) Filed: Oct. 30, 2015

(65) Prior Publication Data

US 2017/0123935 A1    May 4, 2017

(51) Int. Cl.
| | |
|---|---|
| *G06F 16/27* | (2019.01) |
| *G06F 16/11* | (2019.01) |
| *G06F 11/14* | (2006.01) |
| *G06F 16/22* | (2019.01) |

(52) U.S. Cl.
CPC ...... *G06F 11/1451* (2013.01); *G06F 11/1446* (2013.01); *G06F 16/128* (2019.01); *G06F 16/2219* (2019.01); *G06F 16/27* (2019.01); *G06F 2201/84* (2013.01)

(58) Field of Classification Search
CPC ......... G06F 17/30088; G06F 17/30318; G06F 16/27; G06F 16/128
See application file for complete search history.

(56) References Cited

U.S. PATENT DOCUMENTS

| | | | |
|---|---|---|---|
| 2008/0133609 A1* | 6/2008 | Lee ................... | G06F 17/30091 |
| 2010/0094847 A1* | 4/2010 | Malan ............... | G06F 17/30893 707/705 |
| 2015/0237139 A1* | 8/2015 | Chen ................... | H04L 67/1097 709/217 |
| 2016/0259811 A1* | 9/2016 | MacKay ........... | G06F 17/30174 |

(Continued)

OTHER PUBLICATIONS

Harmer; C., "Object-Based File Systems: An Overview", Storage Networking Industry Association, SNIA Education, http://www.snia.org/sites/default/education/tutorials/2009/fall/file/CraigHarmer_Object-based_File_Systems_An_Overview.pdf as visited May 12, 2015, 2009, 38 pages.

(Continued)

*Primary Examiner* — Kris E Mackes
(74) *Attorney, Agent, or Firm* — Troutman Pepper Hamilton Sanders LLP

(57) ABSTRACT

An enterprise may use file level and block level storage for operational access to reap the performance benefits, and use object storage for back-up storage and scale out. Data of objects and objects themselves can be organized to allow for efficient storage management operations, including storage snapshot operations and deduplication operations. A root file container can be represented in object storage with a metadata object ("file container object") and child file container can be represented in object storage with a metadata object ("file group object"). Each file can be represented in object storage with a metadata object that indicates the data units of the file depending upon the storage technology hosting the file (e.g., a file data block in file level storage). The data units of the file can be represented in object storage as elements of a data object.

18 Claims, 17 Drawing Sheets

(56) References Cited

U.S. PATENT DOCUMENTS

2017/0031784 A1\* 2/2017 Lee .................... G06F 11/00
2017/0061006 A1\* 3/2017 Hildebrand ....... G06F 17/30864

OTHER PUBLICATIONS

Leyden; T., "A Beginner's Guide to Next Generation Object Storage", Data Direct Networks, DDN Whitepaper, http://www.ddn.com/pdfs/BeginnersGuideToObjectStorage_whitepaper.pdf as visited May 11, 2015, 2013, 20 pages.

Motta; P., "Enabling Deduplicaiton in a Distributed Object Storage", Random Thoughts on Technology and Meaning of Life, https://pauloricardomg.wordpress.com/2012/03/05/enabling-deduplication-in-a-distributed-object-storage/ as visited Jun. 4, 2015, May 5, 2012, 9 pages.

\* cited by examiner

CLOUD OBJECT DATA LAYOUT (CODL)

BACKGROUND

The disclosure generally relates to the field of data processing, and more particularly to data organization for storage management.

Multiple storage technologies are available and chosen for different reasons. Most people are familiar with file level storage. File level storage stores data as files and files can be organized into folders. A file includes at least one pointer structure with metadata and pointers that resolve to data blocks or other pointer structures that resolve to data blocks. The Common Internet File System (CIFS) or Network File System (NFS) protocols are often used to access files in file level storage. Block level storage stores data as blocks. The small computer system interface (SCSI) and Internet SCSI (iSCSI) are typically used to connect to the block storage servers that provide blocks of data. Block level storage technologies typically have better performance than file level storage technologies, while file level storage technologies are often simpler.

Another storage technology is object-based storage. Object-based storage ("object storage") typically stores objects in a flat namespace. Data is not accessed by resolving pointers through an inode structure or retrieving individual blocks. The structure of an object can vary, but each object is accessed by its identifier or key and can be considered a flexible container of data and/or metadata. Hypertext transfer protocol (HTTP) calls (e.g., PUT, GET) can be used to access objects in object storage.

BRIEF DESCRIPTION OF THE DRAWINGS

Aspects of the disclosure may be better understood by referencing the accompanying drawings.

DESCRIPTION

Figure 1:
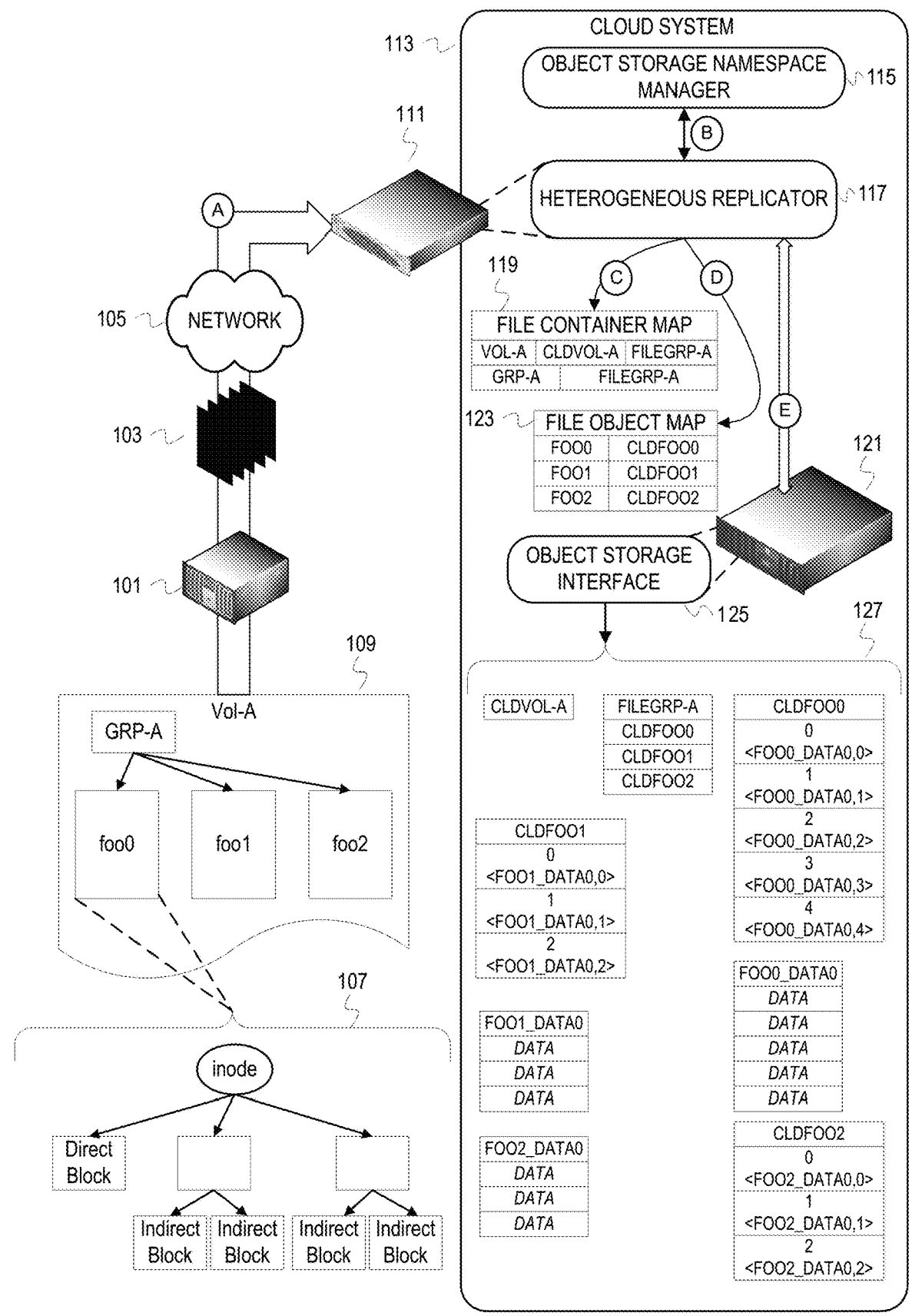
FIG. 1 is a conceptual diagram of creating objects in object storage based on a file in a file system.

The description that follows includes example systems, methods, techniques, and program flows that embody aspects of the disclosure. However, it is understood that this disclosure may be practiced without these specific details. For instance, this disclosure refers to HTTP requests (e.g., GET, PUT) in illustrative examples. But aspects of this disclosure can access object storage in accordance with other protocols, such as the simple object access protocol (SOAP). In other instances, well-known instruction instances, protocols, structures and techniques have not been shown in detail in order not to obfuscate the description.

Terminology

This description uses shorthand terms related to cloud technology for efficiency and ease of explanation. When referring to "a cloud system," this description is referring to the resources of a cloud service provider. For instance, a cloud system can encompass the servers, virtual machines, and storage devices of a cloud service provider. A device of a cloud system refers to an entity that has a network address that can be used as an endpoint for a network connection. The entity may be a physical device (e.g., a server) or may be a virtual entity (e.g., virtual server or virtual storage device).

This description uses the term "stream" to refer to a unidirectional stream of data flowing over a data connection between two entities in a session. The entities in the session may be interfaces, services, etc. The elements of the data stream will vary in size and formatting depending upon the entities communicating with the session. Although the data stream elements will be segmented/divided according to the protocol supporting the session, the entities may be handling the data at an operating system perspective and the data stream elements may be data blocks from that operating system perspective. The data stream is a "stream" because a data set (e.g., a volume or directory) is serialized at the source for streaming to a destination. Serialization of the data stream elements allows for reconstruction of the data set. The data stream may be characterized as "flowing" over a data connection because the data stream elements are continuously transmitted from the source until completion or an interruption. The data connection over which the data stream flows is a logical construct that represents the endpoints that define the data connection. The endpoints can be represented with logical data structures that can be referred to as interfaces. A session is an abstraction of one or more connections. A session may be, for example, a data connection and a management connection. A management connection is a connection that carries management messages for changing state of services associated with the session.

This description also uses the term "key" in the context of an "object key." A key is an identifier, and an object key is an identifier that identifies an object in a namespace of object storage. Although an object key is an identifier, this description uses object key instead of object identifier in an effort to ease distinction between identifiers of a file and identifiers of an object while reading. For instance, an object key and a file identifier may both be alphanumeric strings that can easily be digested by a human reader. An object key may be a more difficult to comprehend value generated from a cryptographic algorithm (e.g., hash value).

Introduction

Object storage can be considered to be more complex than file level storage and to lack the performance capabilities of block level storage, but object storage is characterized as having greater scalability and flexibility than file or block level storage. For instance, the objects are not confined to a predefined size as blocks in file level and block level storage. The scalability and flexibility of object storage make it conducive to deployment in cloud solutions.

Overview

Although scalable and flexible, data layout for objects does not necessarily facilitate efficient storage management. Storage snapshot management, for instance, cannot be efficiently employed with any data layout. In addition, enterprises may rely on multiple storage technologies. An enterprise may use file level and block level storage for operational access to reap the performance benefits, and use object storage for back-up storage and scale out. Data of objects and objects themselves can be organized to allow for efficient storage management operations, including storage snapshot operations and deduplication operations. A file container can be represented in object storage with a metadata object ("file container object") that indicates files organized in the file container. The file container object can be considered an object that corresponds to any file container depending upon platform, file system, etc. For example, the file container object can correspond to a partition, volume, folder, or a directory. These file containers are often hierarchically organized. The example illustrations herein refer to a highest level file container (e.g., a volume) as the root file container object and internal or child file containers (e.g., directories and sub-directories) as file group objects. Since the name of a child file container can vary by file system or platform, this disclosure refers to a group of files or file grouping for files organized into a child file container. Each file can be represented in object storage with a metadata object that indicates the data units of the file depending upon the storage technology hosting the file (e.g., a file data block in file level storage). The data units of the file can be represented in object storage as elements of a data object. Thus, a single data object in object storage can represent multiple data units of a file while maintaining individual identities for various storage management operations.

Example Illustrations

FIG. 1 is a conceptual diagram of creating objects in object storage based on a file in a file system. FIG. 1 includes a file server 101, an intermediary device 111, and an object storage server 121. The file server 101 provides access to data in a file system that includes a volume A 109. The file server 101 communicates with the intermediary device 111 via a network 105. The intermediary device 111 can be a server or group of servers configured/programmed to mediate between a file server and an object storage server. The intermediary device 111 communicates with the object storage server 121 over a network that is not depicted. The object storage server 121 provides access to objects and manages the objects.

In this example illustration, an organization is replicating data from a file system to object storage in a cloud system 113. This replication between different storage technologies is referred to herein as heterogeneous replication. The cloud system 113 includes numerous devices and program instances ("modules"), but only a few are depicted in FIG. 1 to avoid overcomplicating the figure. The objects for the heterogeneous replication are created to preserve the storage management operations (e.g., storage snapshot and deduplication) that are available in the file system and with block level storage. High level operations for this heterogeneous replication are represented with a series of letters A-E. These letters represent stages of operations. Although these stages are ordered for this example, the stages illustrate one example to aid in understanding this disclosure and should not be used to limit the claims. Indeed, many of the operations represented by the stages in FIG. 1 will overlap. The stages illustrate interactions among actors and not necessarily the order of the operations. Subject matter falling within the scope of the claims can vary with respect to the order and some of the operations.

At stage A, the file server 101 streams data (i.e., data stream 103) from a file system to the intermediary device 111. A portion of the data being streamed is depicted as Volume A 109. Volume A is a logical data container that can be a mount point. The volume A 109 includes a directory GRP-A, and the directory GRP-A includes files foo0, foo1, and foo2. An example structure of one of the files, foo0, is depicted as a hierarchical structure 107 of pointers and file data blocks (depicted as direct blocks and indirect blocks). The file server 101 communicates the metadata of the files (e.g., permissions, size, etc.), which are in the inode structures, and the file data, which are in the file data blocks. The file server 101 and the intermediary device 111 will have previously agreed upon or be configured to provide and consume the data stream 103 in a manner that allows the intermediary device to distinguish individual file names or file handles, file metadata, and file data blocks, within the data stream 103

At stage B, a heterogeneous replicator 117 determines object identifiers ("object keys") for the objects to be created for the replication. The heterogeneous replicator 117 replicates data from a file level storage and/or block level storage to object storage. The heterogeneous replicator 117 ("replicator") runs on the intermediary device 111. In this illustration, the replicator 117 communicates with an object storage namespace manager 115 to determine the object keys. The object storage namespace manager 115 ensures uniqueness of object keys within a namespace of the objects. Since objects in this example object storage reside in a flat namespace, multiple objects cannot have a same key within a same namespace. The namespace can be defined by an account within the cloud system 113 or an object container (sometimes referred to as a bucket) within the cloud system 113.

At stage C, the replicator 117 updates mapping information after determining object keys. In this illustration, the replicator 117 updates a file container map 119. The replicator 117 updates the file container map 119 to map the identifier of the file container in the file system to a key of an object created for the file container. The file container map 119 indicates a mapping from "Vol-A" (i.e., the volume name) to "CLDVOL-A" (i.e., the key of the object corresponding to the volume). In addition to the object created for the volume ("root file container object"), the replicator 117 requests creation of an object that indicates groupings of files (e.g., filed organized into a directory in the volume Vol-A ("file group object"). In this example, the volume Vol-A is only depicted with the directory GRP-A for which a file group object will be created. This file group object is identified as "FILEGRP-A," and also maps to both CLDVOL-A and VOL-A. The replicator also adds an entry into the file container map 119 to map the name of the directory "GRP-A" its corresponding object "FILEGRP-A." The mapping structure 119 is only an example and embodiments can organize the mapping information for file containers, both root and child, different. For instance, different mapping structures can be maintained for the root file container and child file containers. The creation of an object for the volume and an object for the group of files in the directory allows efficient access to storage snapshot metadata and tracking of storage snapshots ("snapshots"). The root file container object can be accessed to provide snapshot information for a user interface in response to a query or browsing type of operation without retrieving the larger file group object. The file group object allows for efficient tracking of which files have been modified in each snapshot. The root file container object and the file group object can be classified as metadata objects since the objects have metadata about files. After extracting the volume metadata from the data stream 103, the intermediary device 111 extracts file metadata and file data blocks.

At stage D, the replicator 117 updates a file object map 123 to map file identifiers to file object keys. For files and file data blocks extracted from the data stream 103, the replicator 117 will request creation of file objects and data objects. After determining a key for a file object (stage B), the replicator 117 can map the determined file object key to a corresponding file identifier from the file system. When subsequent requests are received that identify a file from the file system, the replicator 117 can map the identified file to the corresponding file object key and generate a request to the object storage server 121 with the file object key. The replicator 117 will create a data object that has the data of a file and create a file object that indicates the data object. This is illustrated with the objects in the object storage space 127. For the file foo0, a file object CLDFOO0 is created and a data object FOO0_DATA0 is created. The data object FOO0_DATA0 is created with data of the file data blocks of the file foo0. The file object CLDFOO0 is created to indicate the object storage location of each file data block of the file foo0. Each file data block is identified by a file block number 0-4. File block number 0 of file foo0 is at <FOO0_DATA0, 0> as illustrated in the file object CLDFOO0. The location is identified with the data object key "FOO0_DATA0" and an element identifier "0". The element identifier indicates that the data for file block number 0 is at element 0. An "element" can take various forms depending upon the data structure used for the data object. As examples, an element can be a node in a linked list, an entry in a hash table, a section of the object (e.g., the element identifier is an offset after a header of the object), etc.

At stage E, the replicator 117 interacts with the object storage server 121 to create the objects based on the data from the file system. The object storage server 121 hosts an object storage interface 125. The object storage interface 125 forms requests to create, read, delete, etc., objects in the object storage space 127 and provides responses to requests. The replicator 117 may accumulate data about files and then request creation of objects after the data has been accumulated. For example, the replicator 117 can accumulate the volume metadata, directory metadata, metadata of n files, and data of the n files in memory before requesting creation of the corresponding objects. In some cases, the replicator 117 may request the object storage interface 127 to create an object that lacks actual data (e.g., create a data object without data) and then update the object with data extracted from the data stream 103.

After transform of the files foo0, foo1, and foo2, the object storage space 127 includes the metadata objects CLDVOL-A, FILEGRP-A, and the file objects. The file object are "CLDFOO0," "CLDFOO1," and "CLDFOO2."

The file group object FILEGRP-A identifies the file objects that correspond to files in directory GRP-A. The object storage space 127 also includes the data objects that have data. The data objects in the object storage space 127 include "FOO0_DATA0," "FOO1_DATA0," and "FOO2_DATA0."

The conceptual diagram of FIG. 1 is intended as an initial presentation of the cloud data layout in object storage that facilitates efficient storage management. The specific illustrations in FIG. 1 should not be used to limit claim scope. For instance, although the intermediary device 111 determines the object identifiers, the object storage server 121 can determine the identifiers when object creation is requested. In addition, the object storage namespace manager 115 (or components thereof), the heterogeneous replicator 117, and the object storage interface 125 can run on a same device. Mapping data, such as the file container map 119 and the file object map 123 in FIG. 1, are not depicted as being within any particular storage or device. The mapping data can be maintained in memory that is local with respect to the heterogeneous replicator 117 and/or can be maintained in objects in the object storage. Furthermore, a file system instance can have directories at different levels and files at different levels more complex than the simple hierarchy of volume 109.

Figure 2A:
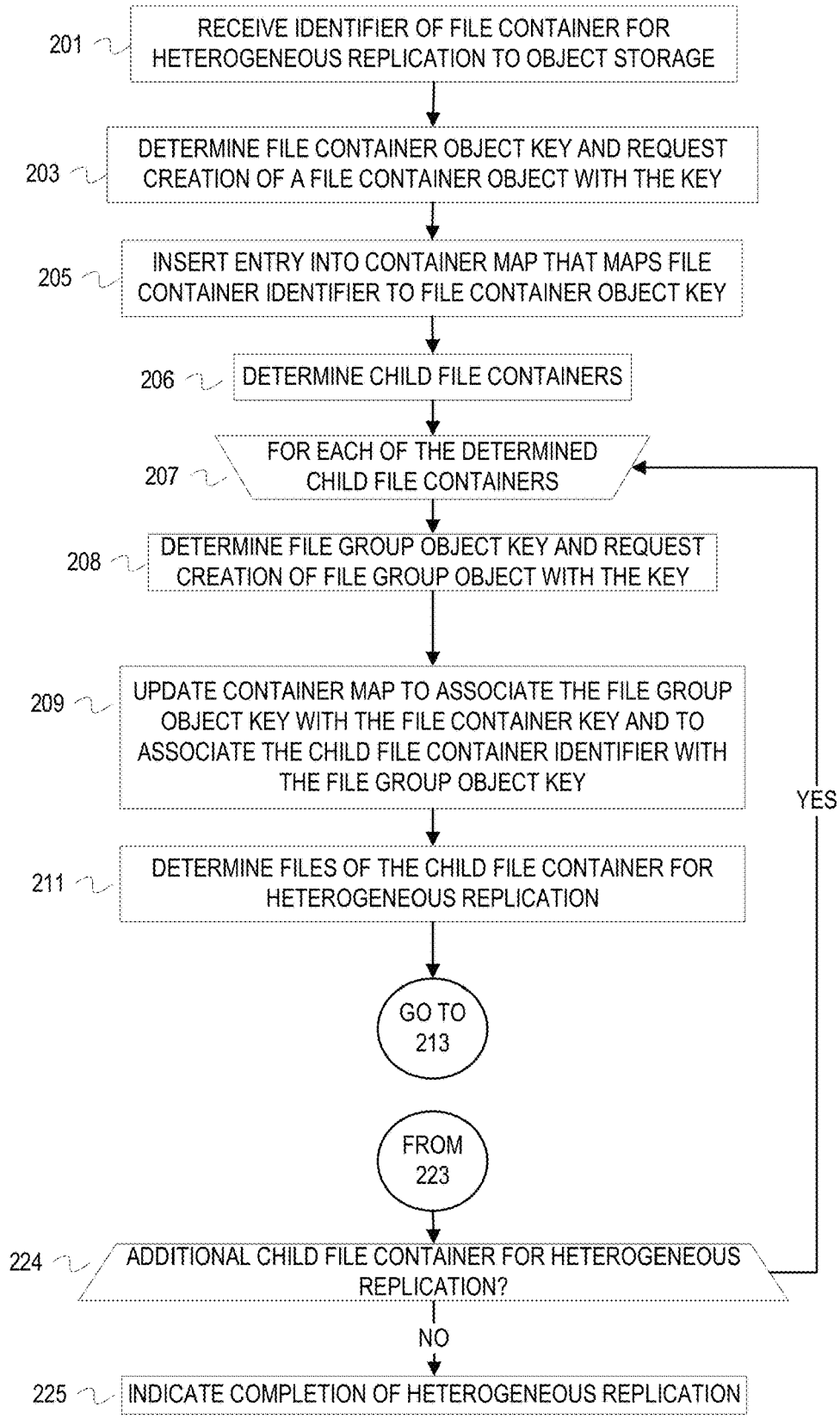
FIGS. 2A-2B are a flowchart of example operations for heterogeneous replication from a file system to object storage.
Figure 2B:
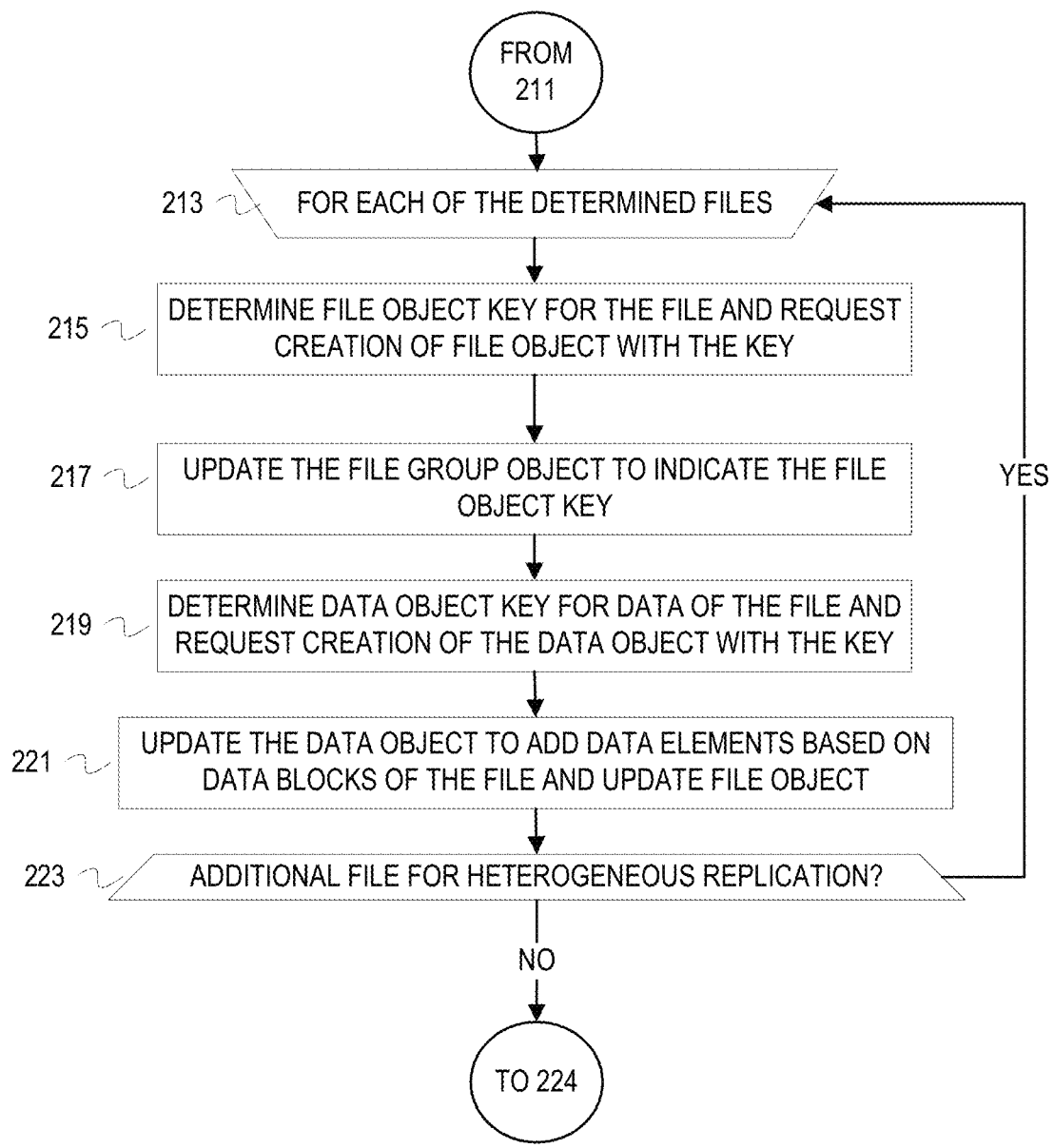

FIGS. 2A-2B are flowcharts of example operations for heterogeneous replication from a file system to object storage. FIGS. 2A and 2B refer to a replicator as performing the operations for consistency with FIG. 1, and should not be used to limit claim scope. Since the term "object" is already used when referring to object storage, entity will be used when referring to a file system. For instance, a file and a directory are file system entities.

At block 201, a replicator receives an identifier of a file container for heterogeneous replication to object storage. A device for a non-object storage data source (e.g., a filer or file server) establishes a connection with the replicator and transmits metadata and data of a file container at the data source and the files in the file container. An initial request can be sent from the data source device to the replicator that indicates the file container that is being replicated. The data source device may communicate a general request for replication and the replicator can determine the file container identifier from the incoming data stream.

At block 203, the replicator determines a root file container object key and requests creation of a root file container object with the key. The replicator obtains a root file container object key that complies with namespace constraints. With the key, the replicator can request (e.g., a PUT request) creation of a root file container object. The replicator can also determine any metadata of the file container (e.g., number of files, date of creation, permissions, etc.). The replicator can request creation of the root file container object with this metadata.

At block 205, the replicator inserts an entry into a container map that maps file container identifiers to root file container object keys. The replicator can maintain a mapping of file container identifiers to root file container object keys for resolving requests that identify the file container in the data source.

At block 206, the replicator determines child file containers in the root file container. The replicator may determine child file containers as data is processed from the input data stream. The data source may communicate the hierarchical structure to the replicator when requesting the heterogeneous replication or within the input data stream. If a hierarchical structure is communicated, the replicator may traverse the hierarchical structure to determine the child file containers and files.

At block 207, the replicator begins a loop of operations for each determine child file container. If the replicator determines child file container by traversal of a hierarchical structure communicated from the data source, the replicator may not perform a loop of operations. The replicator may branch to operations for a file or for a child file container depending upon what the replicator encounters as it processes the input data stream. This example, however, presumes that the replicator determines the child file containers in the root file container and then iterates over the child file containers.

At block 208, the replicator determines a file group object key for the child file container and requests creation of a file group object with the key. The replicator obtains a file group object key that complies with namespace constraints. With the key, the replicator can request (e.g., a PUT request) creation of a file group object. The replicator requests creation of the object with metadata of the child file container (e.g., permissions, links, etc.).

At block 209, the replicator updates a container map to associate the file group object key with the file container key. The replicator also updates the container map to associate the file group object key with an identifier of the child file container (e.g., directory name). For example, the replicator inserts or updates an entry in a table with the mapping information.

At block 211, the replicator determines files of the child file container for heterogeneous replication. The replicator can determine files of the child file container in different manners depending upon the data provided from the data source device. The data stream may have a listing of files before metadata and before data of individual files, which is presumed in FIG. 2. However, the replicator may determine each file as data and metadata of the file are received by the replicator.

FIG. 2B indicates the operations represented by blocks 213, 215, 217, 219, 221, and 223. At block 213, the replicator begins a loop of operations for each determined file that is to be replicated. The loop of operations includes blocks 215, 217, 219, and 221. These operations presume that the replicator is receiving an ordered stream of data that presents file metadata before file data blocks. The replicator can also assemble metadata and data together in memory based on header information in received network protocol data units that identify the corresponding file if unordered.

At block 215, the replicator determines a file object key for the determined file and requests creation of a file object with the file object key. The replicator can use the file name as the file object key after ensuring namespace compliance. The replicator can then send a request to object storage to create an object with the object key. The replicator can also create the file object to also include metadata of the file (e.g., permissions, creation date, modified date, size, etc.).

At block 217, the replicator updates the file group object to indicate the file object key. For example, the replicator requests (e.g., PUT request) that the file group object be updated in object storage. With replication of each file of the file container into the object storage, the file group object is updated to identify the corresponding file object.

At block 219, the replicator determines a data object key for data of the file and requests creation of a data object with the data object key. The data object key can be derived from any one or combination of a file name and a data identifier (e.g., the string "data"), hash of a file name and data identifier, file block number range, etc.

At block 221, the replicator updates the data object to add data elements based on data blocks of the file and updates the file object. After creation of the data object at block 219, the replicator updates the data object with the data of the file data blocks. The replicator also updates the file object to indicate the location of each file data block in the data object. However, the replicator could delay requesting creation of the file object and data object until all of the data for the file has been received. The replicator could update in memory data with the received file metadata and file data blocks. After the metadata and file data blocks are completely received, the replicator can request creation of the objects.

At block 223, the replicator determines whether there is at least one additional file for heterogeneous replication. As examples, the replicator can determine whether a threshold amount of data has been received, whether a threshold number of files have been received, whether the data stream has stopped, whether a delimiter has been encountered, etc. If there is at least one additional file for heterogeneous replication, control returns to block 213. If not, then control continues to block 224.

At block 224, the replicator determines whether there is an additional child file container for heterogeneous replication. If there is, then control flows back to block 207. Otherwise, control flows to block 225.

At block 225, the replicator indicates completion of the heterogeneous replication to the requestor. The replicator can send a message to a requesting entity. The message can be a network message, an inter-process message, etc.

As previously mentioned, heterogeneous replication of data from a file level storage or block level storage into object storage allows an entity to reap the benefits of file/block level storage and object storage in a hybrid solution. The hybrid solution can use the object storage for archival/backup purposes while the file/block level storage is used to primarily handle access requests. In addition, which storage type is used for primary access can be determined based on the type and frequency of accesses. Regardless of how the hybrid solution is used, the hybrid solution allows for storage management operations between the different storage technologies. FIGS. 3-9 illustrate examples for snapshot operations. FIGS. 10-13 illustrate examples for deduplication operations.

Figure 3A:
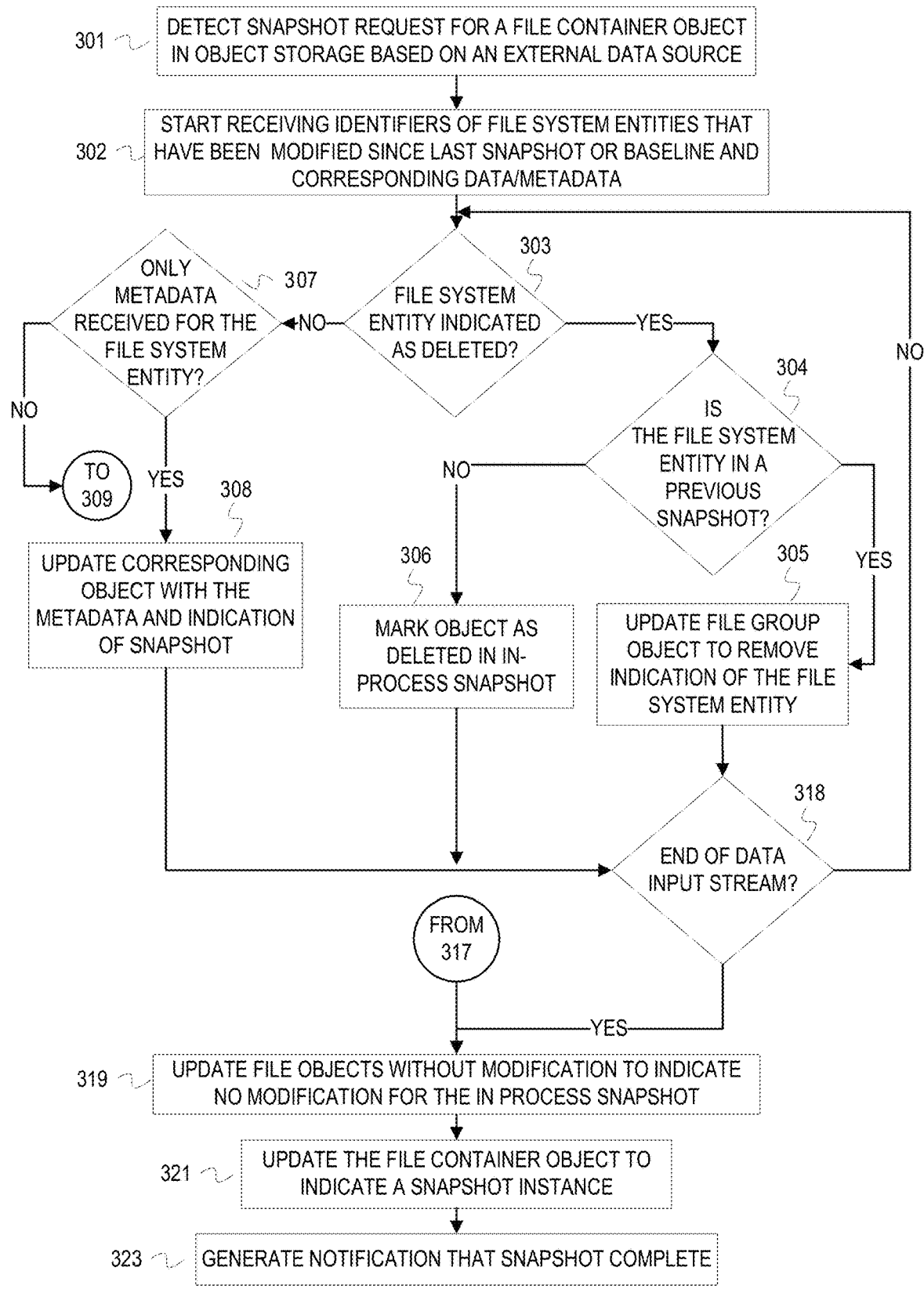
FIGS. 3A-3B are a flowchart of example operations for creating a snapshot of a file container in object storage.
Figure 3B:
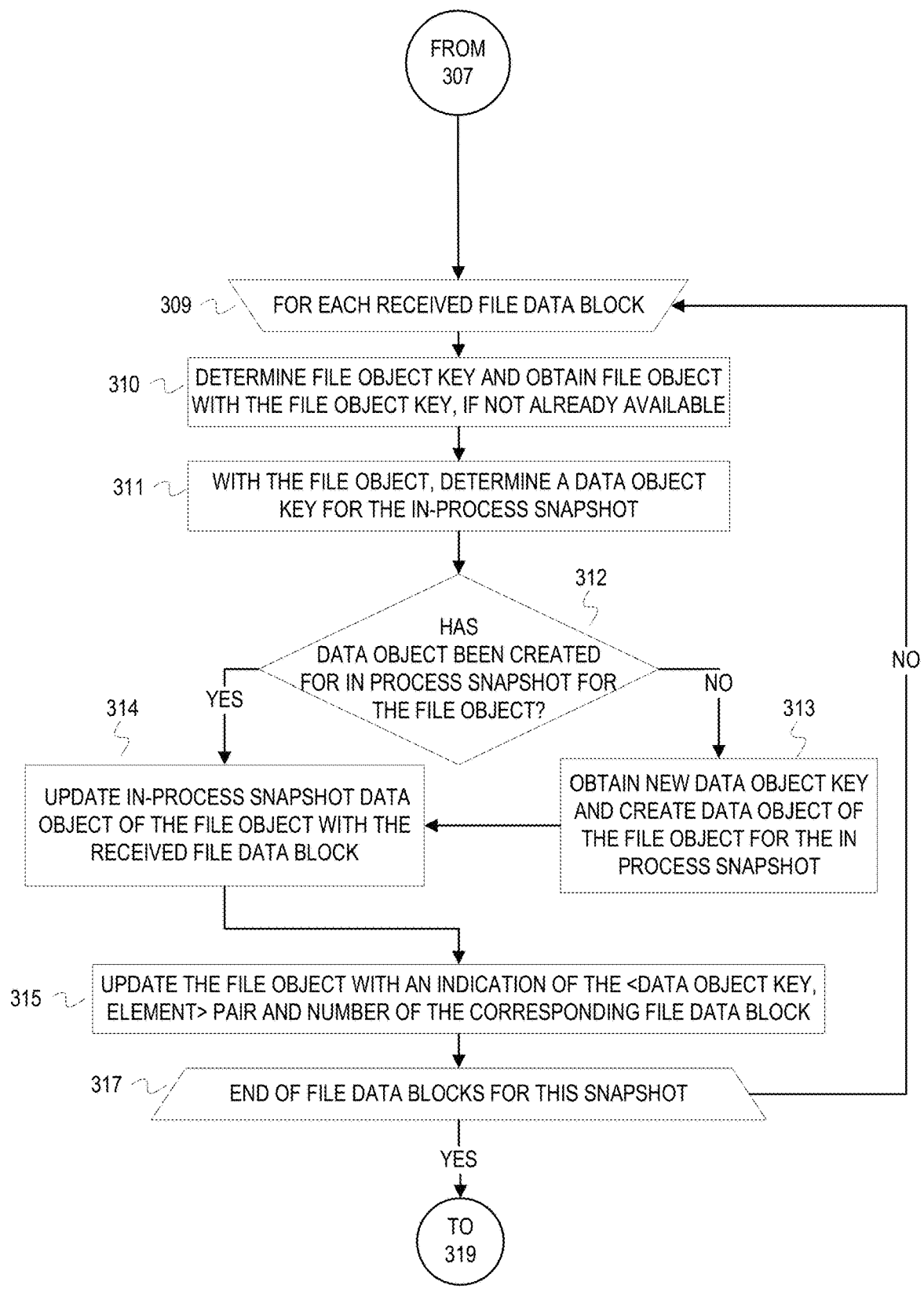

FIGS. 3A-3B are flowcharts of example operations for creating a snapshot of a file container in object storage. Although implementations can vary, a storage snapshot is a point-in-time representation of state of a storage system. The "storage system" can vary in granularity depending upon implementation and/or configuration. For instance, the storage system can be a volume or several storage arrays. FIGS. 3A-3B presume a snapshot granularity of a file container and refers to a storage manager as performing the example operations of FIGS. 3A-3B.

At block 301, a storage manager detects a snapshot request for a root file container object in object storage based on an external non-object storage data source. Prior to the snapshot request, an external non-object storage data source heterogeneously replicated data into the object storage. This initial replication could be considered a baseline for a subsequent snapshot. The request likely indicates a root file container identifier from the external data source. The storage manager resolves the root file container identifier to a root file container object key with mapping data created with the replication.

At block 302, the storage manager starts receiving identifiers of file system entities that have been modified since a last snapshot or baseline and data and/or metadata corresponding thereto. The received data indicates files and file block numbers along with the file data blocks corresponding to the file block numbers. For example, a received network protocol data unit can indicate a file handle, a file block number, and a file data block corresponding to the file block number.

At block 303, the replicator determines whether a file system entity has been deleted based on the received identifiers. The data received by the replicator can indicate files that are deleted with tags or markers that indicate deletion, with metadata that indicates a file to be deleted, etc. If an indicated file system entity is not deleted, then control flows to block 307. If the indicated file system entity has been deleted, then control flows to block 304.

At block 304, the replicator determines whether the deleted file system entity is in a previous snapshot. The replicator can access the file group object to determine whether the deleted file system entity was in a previous snapshot. If the deleted file system entity was not in a previous snapshot, then the replicator marks an indication of the deleted file as to be deleted in the in-process snapshot at block 306. For instance, the replicator adds data or modifies data in the file group object. If the deleted file system entity is in a previous snapshot, then the replicator updates the file group object to remove indication of the file system entity for the in-process snapshot (305).

Control flows from both blocks 305 and 306 to block 318, where the replicator determines whether the end of the input data stream has been reached. If the end of the input data stream has been reached, then control flows to block 319. Otherwise, control returns to block 303.

At block 307, the replicator determines whether only metadata was modified for the file system entity. The replicator can determine that an end of file system entity or new file system entity is indicated in the input data stream after only received metadata for a file system entity. The input data stream can include a marker or flag to indicate that only metadata for a file system entity has been modified. If only metadata has been modified for a file system entity, then control flows to block 308. Otherwise, control flows to block 309.

At block 308, the replicator adds an indication of the in-process snapshost, if not already done, to the corresponding object of the file system entity. The replicator also records the modified metadata to the corresponding object and associates the modified metadata with the indication of the in-process snapshot. Control flows to block 318 from 308.

FIG. 3B includes blocks that represent operations for updating data objects. At block 309, the storage manager begins a loop of operations for each received file data block.

At block 310, the storage manager determines a file object key and obtains a file object with the file object key, if the file object is not already available. The storage manager may have obtained (e.g., using a GET request) the file object for a previous file data block. If that file object is still in memory used by the storage manager ("working memory"), then the storage manager can avoid another request to object storage. If the storage manager uses objects loaded into working memory, the storage manager may set a time limit for objects in working memory to expire and no longer be available.

At block 311, the storage manager determines, with the file object, a data object key for the in-process snapshot.

At block 312, the storage manager determines whether a data object has been created for the in-process snapshot for the file object. The file object that was previously obtained (310) indicates data objects in each snapshot. As previously described, the file object identifies location of each file data block within a data object with a <DATA OBJECT KEY, ELEMENT> pair. The <DATA OBJECT KEY, ELEMENT> pair can be used to obtain the data object and read the file data block from the specified location. The file data block is identified in the file object with a file block number carried over from the external non-object storage data source. But the file object will not indicate a data object key for the in-process snapshot initially. If the file data block is the first file data block of the modified file for the in-process snapshot, then the file object will not indicate a data object for the in-process snapshot because that data object has not yet been created. A data object will have been created for the baseline (e.g., initial replication) of a file or file object. Another data object is created for the file object if the corresponding file was modified since the baseline or preceding snapshot. If the file object does not indicate a data object key for the in-process snapshot, then control flows to block 313. Otherwise, control flows to block 314.

At block 313, the storage manager obtains a new data object key and creates a data object of the file object for the in-process snapshot ("in-process snapshot data object"). Since this is the first data object for the in-process snapshot, the storage manager can also update the file object to indicate the in-process snapshot. Although not necessary, the data object keys can be created to indicate a corresponding snapshot. Referring to FIG. 1, a new data object for a first snapshot can be created for foal (assuming foal has been modified since the initial replication) with a data object key "FOO0_DATA1." Control flows from block 313 to block 314.

At block 314, the storage manager updates the in-process snapshot data object with the received file data block. For example, the storage manager can request an object storage server to update the data object with the received file data block. The object storage server can then append an element with the file data block to the data object.

At block 315, the storage manager updates the file object with an indication of the <DATA OBJECT KEY, ELEMENT> pair for the file block number that identifies the file data block. For example, the storage manager requests an object storage server to update the file object with the location information <DATA OBJECT KEY, ELEMENT>.

At block 317, the storage manager determines whether an end has been reached for the file data blocks for this snapshot. If so, then control flows to block 319 in FIG. 3A. If not, then control returns to block 309 for a next file data block.

At block 319, the storage manager updates file objects corresponding to files that were not modified since the baseline or previous snapshot. For example, the storage manager sends out a series of requests for each of the unaffected file objects to object storage. The update indicates that the corresponding file was not modified. This can be done at a later time when the file object is impacted by a snapshot operation. For example, the storage manager can indicate that there were no modifications for a file object in snapshot instance 1 when updating the file object to indicate modifications to the corresponding file in snapshot instance 2.

At block 321, the storage manager updates the root file container object to indicate the snapshot instance. A snapshot instance can be indicated with an alphanumeric identifier (e.g., "S2"), a time stamp when the snapshot was requested, etc.

At block 323, the storage manager generates a notification that the snapshot instance is complete.

Figure 4A:
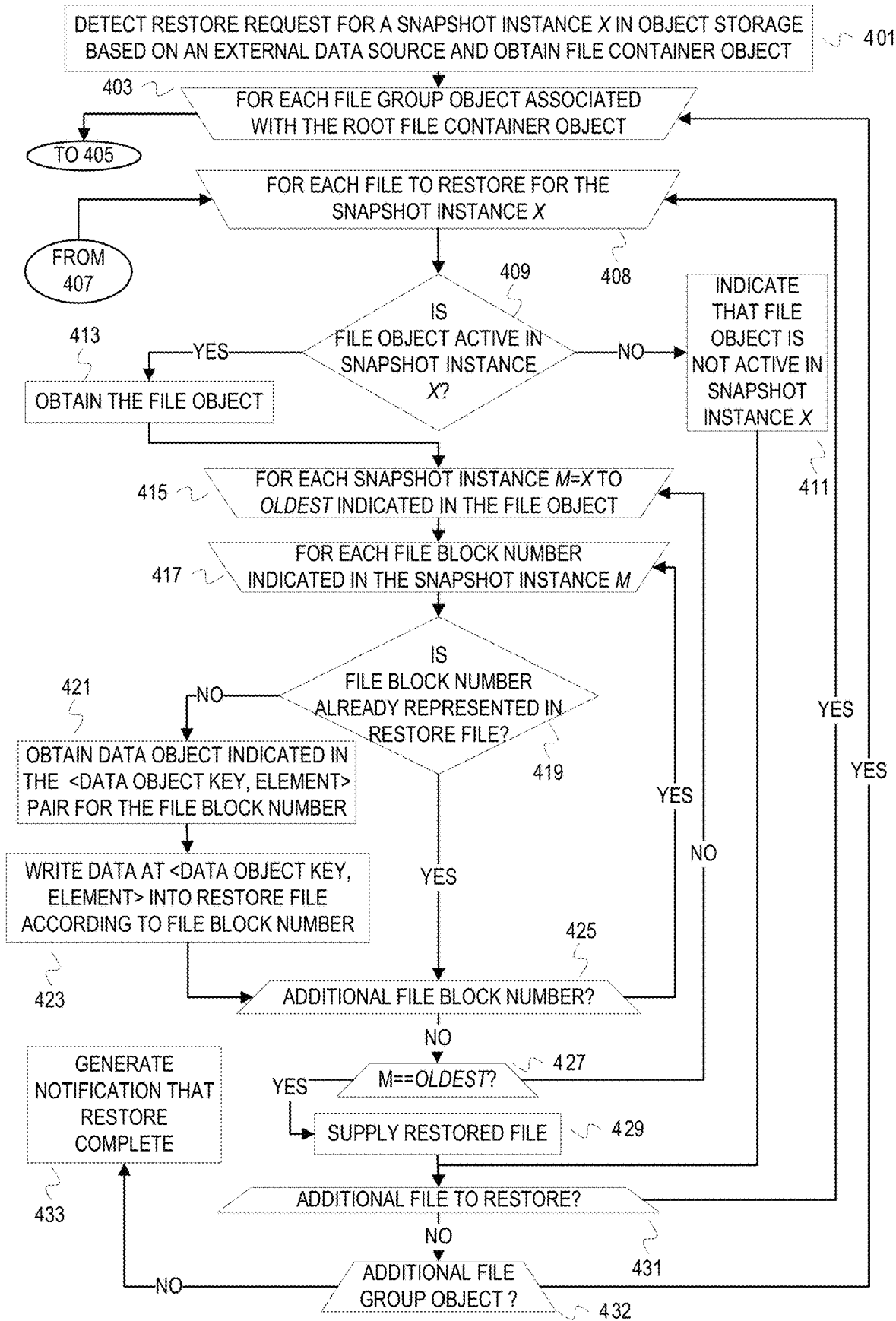
FIGS. 4A-4B are a flowchart of example operations for restoring each file from an object storage for a specified snapshot instance from the requested snapshot instance to an oldest snapshot instance until completion of the restore.
Figure 4B:
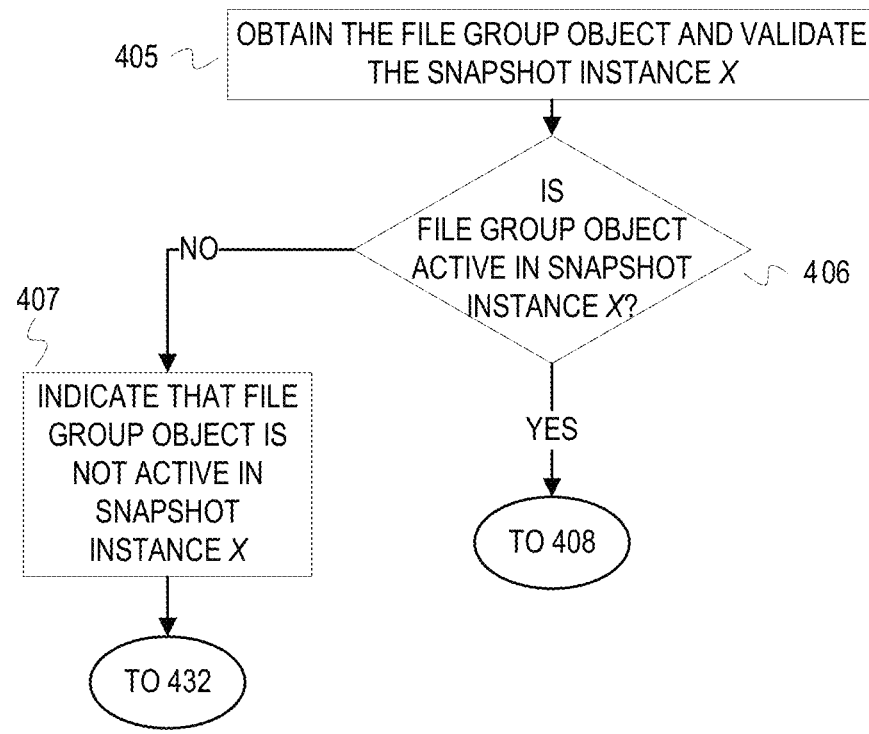
Figure 5:
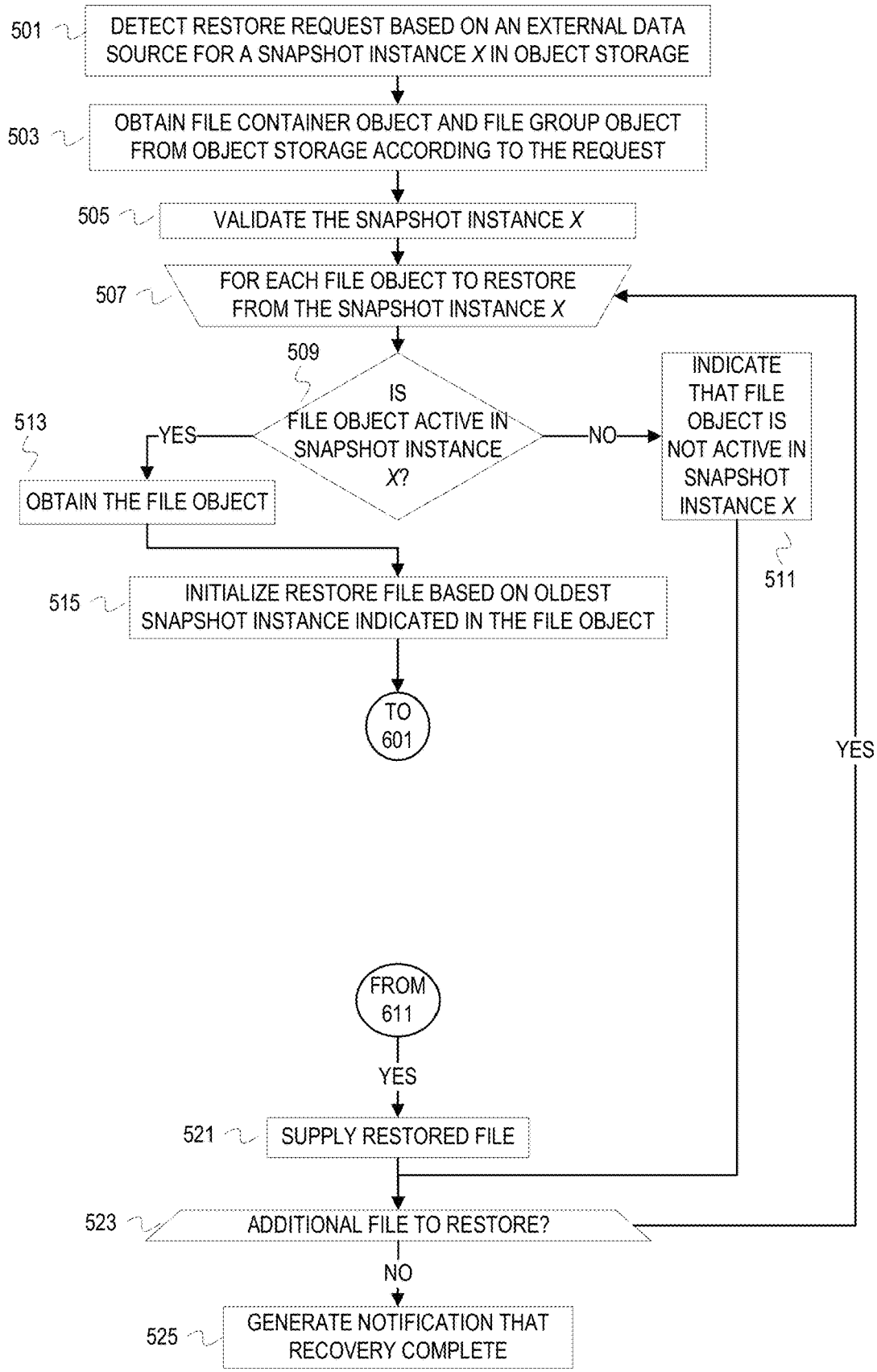
FIGS. 5-6 build each restore file from the oldest snapshot to the requested snapshot instance.
Figure 6:
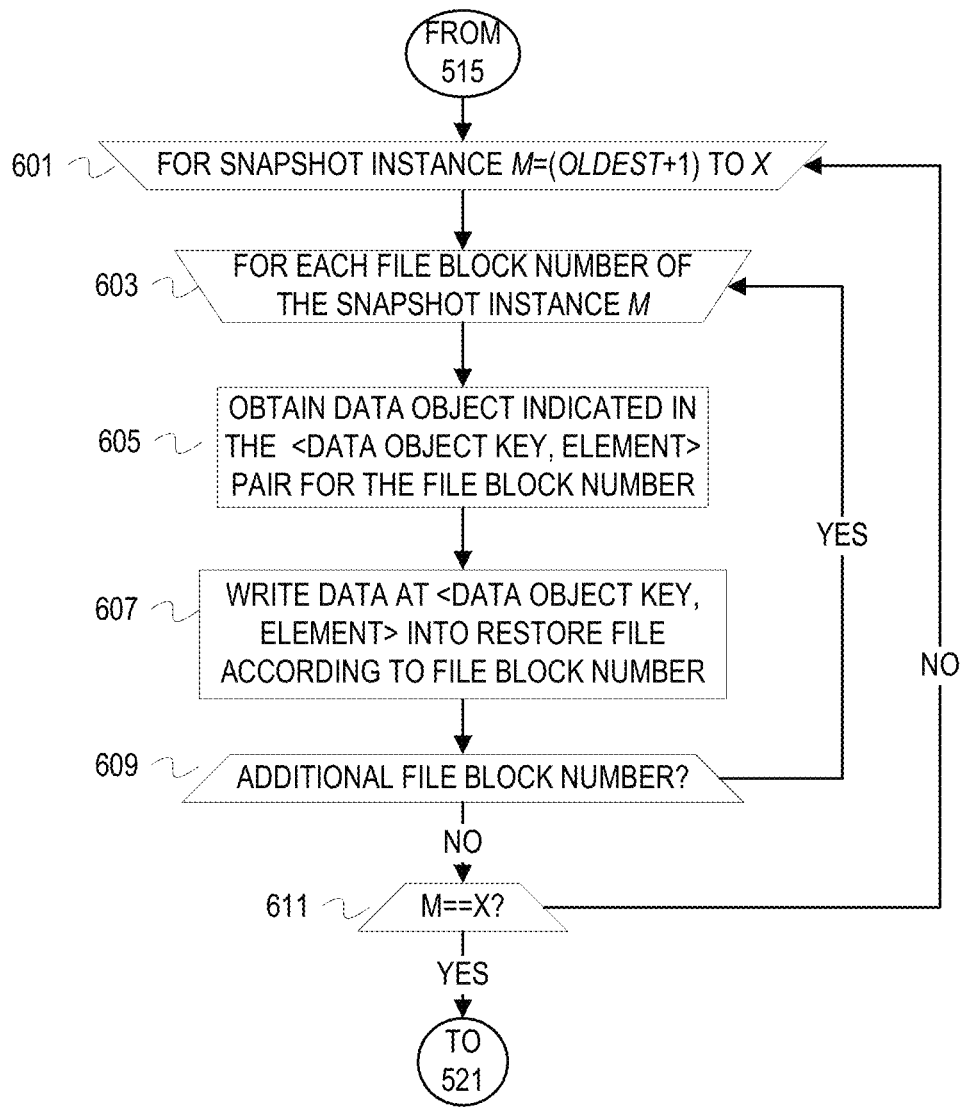
Figure 7:
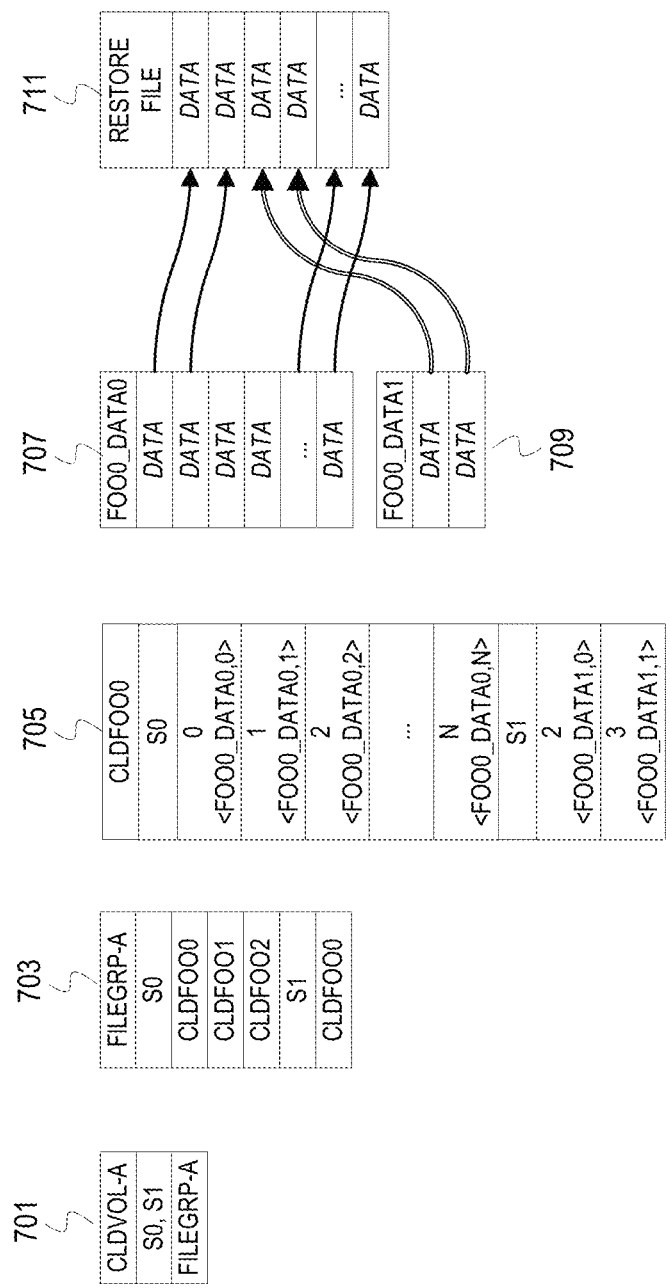
FIG. 7 depicts examples of objects used to restore a file for a snapshot instance from object storage.

FIGS. 4-6 are different flowcharts for example restorations of a snapshot instance from object storage. FIGS. 4A-4B and 5 will refer to FIG. 7. FIG. 7 depicts examples of objects used to restore a file for a snapshot instance from object storage. FIG. 4 is a flowchart of example operations for restoring each file from an object storage for a specified snapshot instance from the requested snapshot instance to an oldest snapshot instance until completion of the restore.

At block 401, a storage manager detects a restore request for a snapshot instance X in object storage based on an external data source, and obtains a file container object associated with the request. As with FIG. 3, the external data source is a non-object storage data source from which data was previously heterogeneously replicated into the object storage. The storage manager receives the request from a device of the external data source. However, the storage manager and requestor may be instantiated on a same device. Thus, the request may be an inter-process request or a request between virtual machines. The restore request indicates a target of the restore, for example a root file container. The storage manager resolves an identifier of the root file container to the file container object key. With the key, the storage manager requests the file container objects.

At block 403, the storage manager processes each of the file group objects associated with the file container object. The storage manager can use mapping data to determine child file containers of the root file container, and resolve each of the child file container identifiers to corresponding file group objects. In FIG. 7, a file container object 701 and a file group object 703 are depicted. The file container object 701 has a key CLDVOL-A and indicates two snapshot instances. The file container object 701 also indicates the file group object key "FILEGRP-A." If a file container object indicates file group object keys, then this information may not be indicated in the mapping data. The file group object 703 indicates three file objects as members of the group. The members have the keys "CLDFOO0," "CLDFOO1," and "CLDFOO2." A file object 705 corresponds to the key "CLDFOO0." Control flows from 403 to block 405 in FIG. 4B.

At block 405 of FIG. 4B, the storage manager obtain the file group object and validates the snapshot instance. The storage manager can read the root file container object and determine whether the snapshot instance X exists for the file container. If it does not exist, then a notification indicating the absence of snapshot instance X can be generated.

At block 406, the storage manager determines whether the file group object (i.e., the child file container) is active in snapshot instance X. If the file group objects is indicated as deleted in the snapshot instance X or X−1, then the file group object is not active. If the file group object is active, then control flows to block 408. Otherwise, control flows to block 407 where the storage manager indicates that the file group object is not active in the snapshot instance X. Control flows from block 406 back to block 432. At block 432, the storage manager determines whether there is another file group object to process.

At block 408, the storage manager begins a loop of operations for each file to restore for snapshot instance X from the object storage. The storage manager determines each file object with the file group object. The file group object also indicates each file object impacted by a snapshot instance. Referring to FIG. 7, the file group object 703 indicates that the file corresponding to the file object 705 was modified prior to the snapshot instance S1.

At block 409, the storage manager determines whether the file object is active in the snapshot instance X. A file may have been deleted prior to snapshot instance X. The file group object can indicate the deletion. If the file object is not active in the snapshot instance X, then control flows to block 411. Otherwise, control flows to block 413.

At block 411, the storage manager indicates that the file object is not active in the snapshot instance X. This information can be recorded into the restoration information and/or into a separate notification. Control flows from block 411 to block 431.

At block 413, the active file object is obtained. To obtain the file object, the storage manager determines the key of the file object from the file group object.

At block 415, the storage manager begins a loop of operations for each snapshot instance from the requested snapshot X instance to the oldest snapshot instance indicated in the file object. The snapshot instance for a current iteration in the loop is designated as snapshot instance M.

At block 417, the storage manager begins a nested loop of operations for each file block number indicated in the file object for the snapshot instance M.

At block 419, the storage manager determines whether the file block number is already represented in the restore file. The storage manager can construct files being restored in memory and track the file block numbers that have been restored internally (i.e., within the restored file) or externally (e.g., a data structure that lists all file block numbers incorporated into a restore file). Internal representation of a file block number can be explicit or implicit. As an example of implicit indication, the storage manager determines that a file block number has already been incorporated into the restore file by determining whether data resides at an offset within the file corresponding to the file block number. If the file block number is already represented, then control continues to block 425. If not, then control flows to block 421.

At block 421, the storage manager obtains a data object indicated in the <DATA OBJECT KEY, ELEMENT> pair for the file block number indicated in the file object. Referring to FIG. 7, the storage manager can read the file object 705 to determine that snapshot instance S1 includes file block numbers 2 and 3. The file object 705 indicates that the file block number 2 for snapshot instance S1 is at <FOO0_DATA1,0>. The storage manager will then obtain a data object 709 identified with the key FOO0_DATA1 and read element 0 to obtain the data for file block number 2.

At block 423 of FIG. 4, the storage manager writes the data at <DATA OBJECT KEY, ELEMENT> into the restore file according to the file block number. Based on the file block number, the storage manager can determine where the data should be written into the file being restored. Referring again to FIG. 7, the storage manager writes the data from <FOO0_DATA1,0> into a restore file 711. As depicted in FIG. 7, the data from <FOO0_DATA1,1> for file block number 3 is written into the restore file 711. The remainder of the restore file 711 is constructed with data from a data object 707, "FOO0_DATA0," according to the snapshot instance information in the file object 705.

At block 425 of FIG. 4, the storage manager determines whether there is an additional file block number represented in the data object that was obtained. Since the data object includes data for the snapshot instance M, the storage manager can traverse the data object and extract the data of represented file block numbers to restore the file. If there is an additional element, then control flows back to block 417. If not, control flows to block 427.

At block 427, the storage manager determines whether the oldest snapshot instance has been processed. FIG. 4 indicates a determination of whether M==OLDEST. But embodiments do not necessarily traverse back to an oldest snapshot instance. Embodiments can determine whether the restore file is complete and continue on to restoring another file. A restore file may be fully restored before processing an oldest snapshot instance for various reasons, including snapshot instances not yet being consolidated. If the oldest snapshot instance has been processed, then control flows to block 429. Otherwise, control returns to block 415 for the next snapshot instance.

At block 429, the storage manager supplies the restored file to the requestor or a destination specified in the restore request. The storage manager may queue restored files up to a threshold before supplying instead of supplying individual restored files. The storage manager may also delay supplying restored files until all files have been restored.

At block 431, the storage manager determines whether another file is to be restored from object storage. If there is another file to restore, then control returns to block 407. If not, then control flows to block 432. If there are no more file group objects to process, then control flow from block 432 to block 433.

At block 433, the storage manager generates a notification that the restore is complete.

In contrast to FIG. 4, FIGS. 5-6 build each restore file from the oldest snapshot to the requested snapshot instance. A number of the example operations in FIGS. 5-6 are similar to the example operations in FIG. 4, but are described for completeness.

At block 501, a storage manager detects a restore request for a snapshot instance X in object storage based on an external data source. As previously stated, the external data source is a non-object storage data source from which data was previously heterogeneously replicated into the object storage. The storage manager receives the request from a device of the external data source. However, the storage manager and requestor may be instantiated on a same device. Thus, the request may be an inter-process request or a request between virtual machines.

At block 503, the storage manager obtains a root file container object and a file group object from object storage according to the restore request. The restore request indicates a target of the restore, for example a file container. The storage manager resolves an identifier of the file container to the root file container object key and the file group object key with mapping data created with the heterogeneous replication. With the keys, the storage manager requests the objects. If the file group object key for a root file container object is indicated in the root file container object, then this information may not be indicated in the mapping data.

At block 505, the storage manager validates the snapshot instance. The storage manager can read the root file container object and determine whether the snapshot instance X exists for the file container. If it does not exist, then a notification indicating the absence of snapshot instance X can be generated.

At block 507, the storage manager begins a loop of operations for each file to restore for snapshot instance X from the object storage. The storage manager determines each file object with the file group object. The file group object also indicates each file object impacted by a snapshot instance.

At block 509, the storage manager determines whether the file object is active in the snapshot instance X. A file may have been deleted prior to snapshot instance X. The file group object can indicate the deletion. If the file object is not active in the snapshot instance X, then control flows to block 511. Otherwise, control flows to block 513.

At block 511, the storage manager indicates that the file object is not active in the snapshot instance X. This information can be recorded into the restoration information and/or into a separate notification. Control flows from block 511 to block 531.

At block 513, the storage manager obtains the active file object. To obtain the file object, the storage manager determines the key of the file object from the file group object.

At block 515, the storage manager initializes a restore file based on an oldest snapshot instance indicated in the obtained file object. Referring to FIG. 7, the storage manager can read the file object 703 and determine that the oldest snapshot instance for the file object 703 is S0. The storage manager can also determine that the data object 707 ("FOO0_DATA0) corresponds to the oldest snapshot instance. The storage manager can then create the restore file 711 based on the data in the data object 707.

From block 515, control flows to block 601 of FIG. 6. At block 601, the storage manager begins a loop of operations for each snapshot instance from the next to the oldest snapshot instance to the requested snapshot X instance. The snapshot instance for a current iteration in the loop is designated as snapshot instance M.

At block 603, the storage manager begins a nested loop of operations for each file block number indicated in the file object for the snapshot instance M.

At block 605, the storage manager obtains a data object indicated in the <DATA OBJECT KEY, ELEMENT> pair for the file block number indicated in the file object.

At block 607, the storage manager writes the data from <DATA OBJECT KEY, ELEMENT> into the restore file according to the file block number. Based on the file block number, the storage manager can determine where the data should be written into the file being restored. Referring again to FIG. 7, the storage manager initialized the restore file 711 with the data from the data object 707. When the storage manager processes snapshot instance S1, the storage manager will overwrite the data of file block numbers 2 and 3 with data from the data object 709.

At block 609 of FIG. 6, the storage manager determines whether there is an additional file block number represented in the data object that was obtained. Since the data object includes data for the snapshot instance M, the storage manager can traverse the data object and extract the data of represented file block numbers to restore the file. If there is an additional file block number represented, then control flows back to block 603. If not, control flows to block 611.

At block 611, the storage manager determines whether the requested snapshot instance has been processed. FIG. 6 indicates a determination of whether M==X. If the snapshot instance X has been processed, then control flows to block 521 of FIG. 5. Otherwise, control returns to block 601 for the next snapshot instance.

At block 521, the storage manager supplies the restored file to the requestor or a destination specified in the restore request. The storage manager may queue restored files up to a threshold before supplying instead of supplying individual restored files. The storage manager may also delay supplying restored files until all files have been restored.

At block 523, the storage manager determines whether another file is to be restored from object storage. If there is another file to restore, then control returns to block 507. If not, then control flows to block 525.

At block 525, the storage manager generates a notification that the restore is complete.

Figure 8:
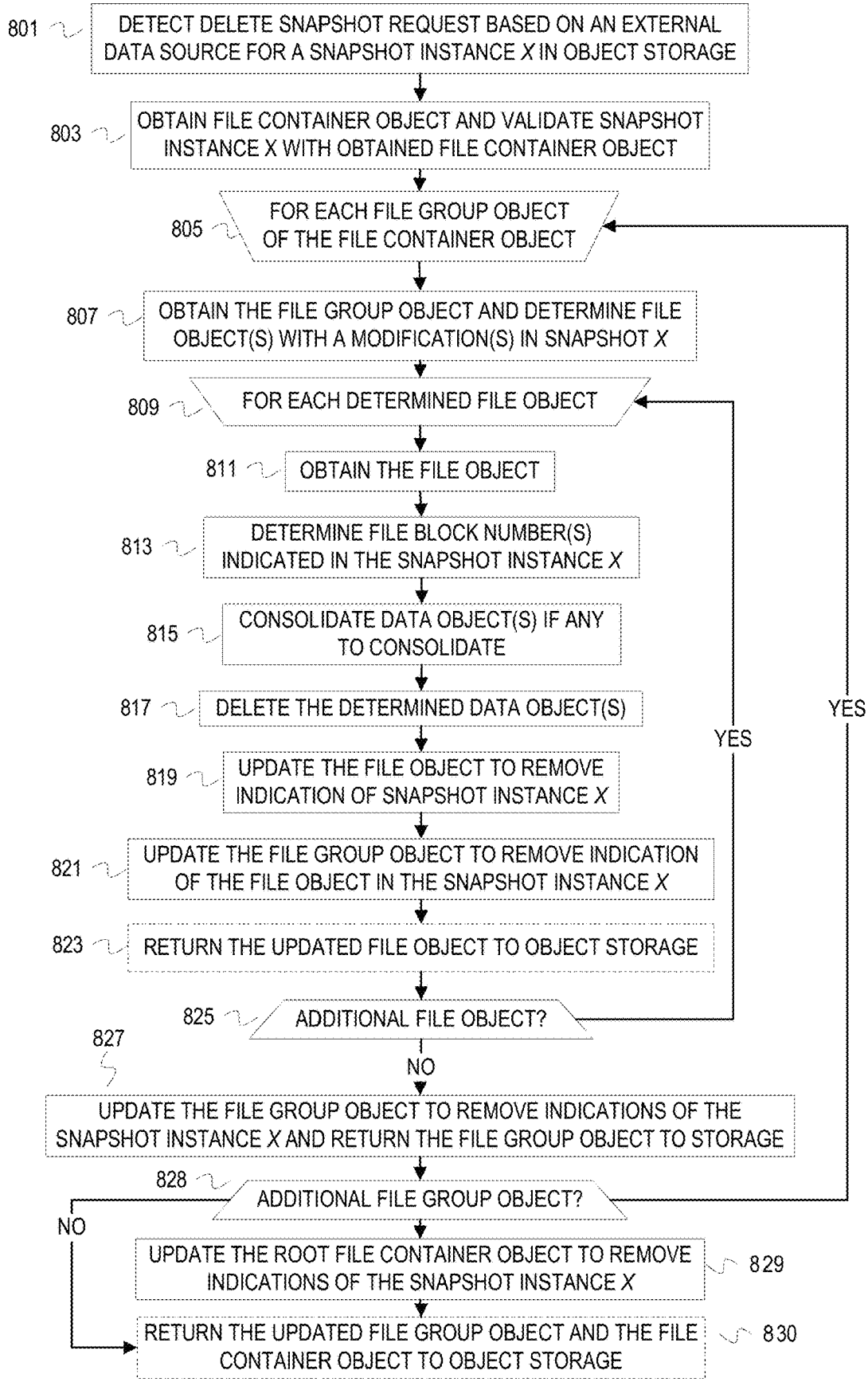
FIG. 8 depicts a flowchart of example operations for deleting a snapshot instance in object storage.

In addition to restoring a target to a snapshot instance, a snapshot instance can be deleted. FIG. 8 depicts a flowchart of example operations for deleting a snapshot instance in object storage.

At block 801, a storage manager detects a request based on an external non-object storage data source to delete a snapshot instance X in object storage. The storage manager and requestor may be on different devices or may be instantiated on a same device. The request may be communicated over a network, an inter-process mechanism, between virtual machines, etc.

At block 803, the storage manager obtains a root file container object and validates the snapshot instance X with the obtained root file container object. The storage manager reads the request to determine a target of the delete request. For example, the delete request can indicate a file container in addition to the snapshot instance X to be deleted. The storage manager uses mapping data to determine a key for a root file container object that corresponds to the target file container, and requests the root file container object with the root file container object key. If the storage manager determines that snapshot instance X does not exist based on the metadata in the root file container object, then the requestor is notified accordingly.

At block 805, the storage manager begins processing each of the file group objects associated with the root file container object. The storage manager can determine the file group objects associated with the root file container object from mapping data. Mapping data can associate the file group objects associated with child file containers of the root file container. In some embodiments, an the root file container object can indicate keys of child file container objects associated with the root file container in metadata of the root file container object, for example.

At block 807, the storage manager obtains the file group object and determines a file object(s) with a modification(s) in snapshot instance X based on the obtained file group object. As discussed earlier, the file group object has metadata that indicates which file objects corresponds to files that were modified prior to a snapshot instance.

At block 809, the storage manager begins a loop of operations for each file object indicated for snapshot instance X in the file group object. The storage manager reads the file group object to determine which file objects are indicated for snapshot instance X.

At block 811, the storage manager obtains the file object indicated for the snapshot instance X in the file group object. The storage manager reads the file object key from the file group object, and requests the file object with the file object key.

At block 813, the storage manager determines which file block number(s) is indicated in the obtained file object for the snapshot instance X and a corresponding data object(s). Referring to FIG. 7, the storage manager reads the file object 705 and determines that file block numbers 2 and 3 are indicated for the snapshot instance S1. The storage manager also determines the data object key of the data object with data for file block numbers 2 and 3 as FOO0_DATA1.

Figure 9:
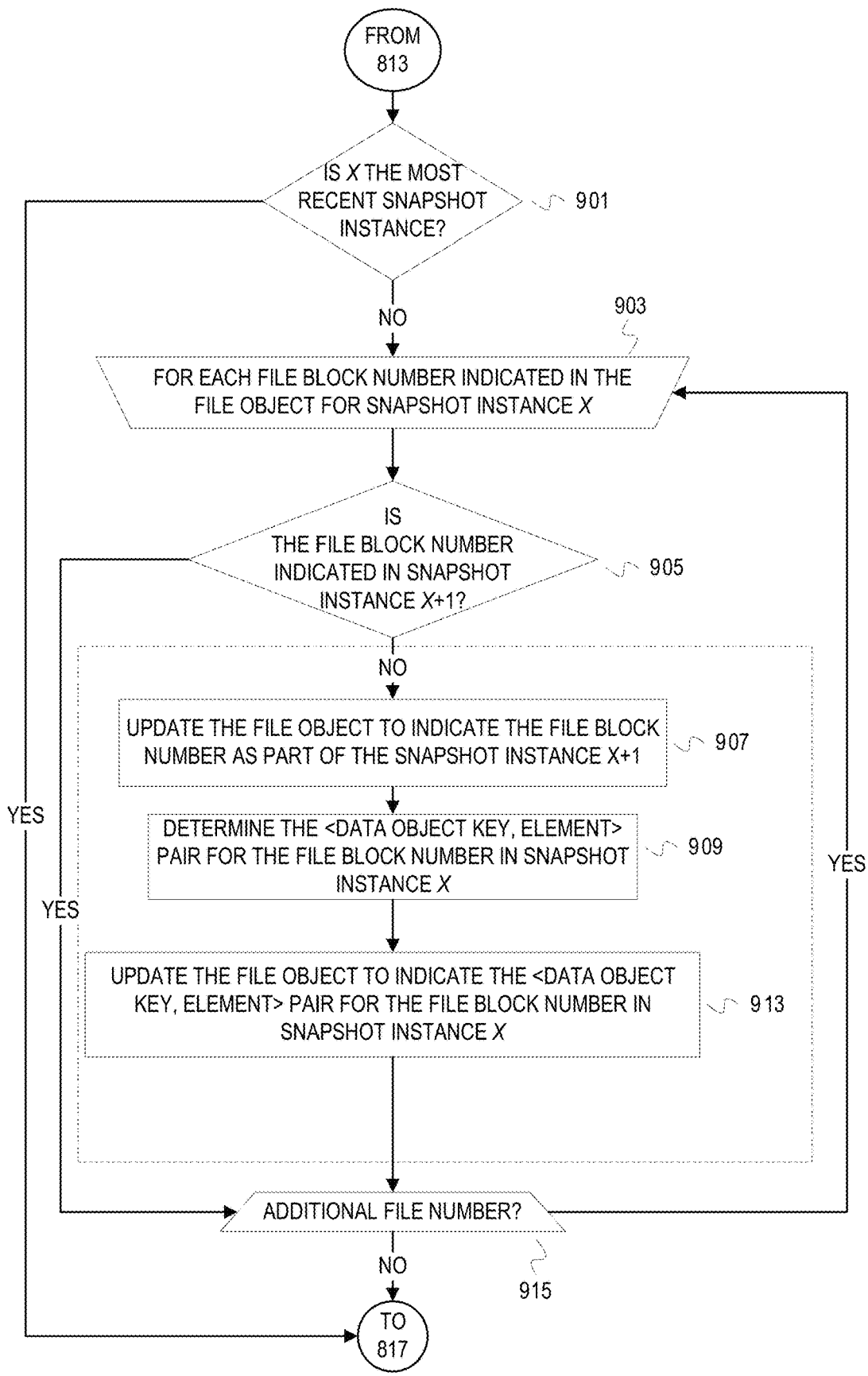
FIG. 9 is a flowchart of example operations for consolidating data objects for a delete snapshot request.

At block 815 of FIG. 8, the storage manager consolidates data objects, if there are any to consolidate. FIG. 9 elaborates on this operation.

At block 817, the storage manager deletes the determined data objects. The storage manager has determined the keys of the data objects corresponding to snapshot instance X and requests deletion of the data objects with the determined data object keys.

At block 819, the storage manager updates the file object to remove indication of the snapshot instance X. For example, the storage manager requests an object storage server to update the file object to remove the indication of the snapshot instance X. This update can be carried out differently depending on how the file object is structured. The object storage server can overwrite the part of the file object that indicates the snapshot instance X with null values. The object storage server can release or free elements of the file object that indicate snapshot instance X. The storage manager can recreate the file object in working memory without the indication of snapshot instance X and request the recreated file object be written into object storage with the same file object key.

At block 821, the storage manager updates the file group object to remove indication of the file object in snapshot instance X. For example, the storage manager requests an object storage server to update the file group object to remove the indication of the file object in the snapshot instance X. As with the update to the file object, this update can be carried out differently depending on how the file group object is structured. An object storage server can overwrite the part of the file group object that indicates the snapshot instance X with null values. An object storage server can release or free elements of the file group object that indicate snapshot instance X. The storage manager can recreate the file group object in working memory without the indication of snapshot instance X and request the recreated file group object be written into object storage with the same file group object key. The storage manager could also delay requesting update of the recreated file group object into object storage until after all file objects have been processed for the delete request.

At block 823, the storage manager returns the updated file object (block 819) to object storage. The storage manager in this example illustration waits until after updating the file group object to request object storage to update the file object. This can help avoid an inconsistency between file objects and a corresponding file group object. Block 823 is depicted in a dashed line since it may not be performed when updates are coalesced into a single request.

At block 825, the storage manager determines whether there is an additional file object to process for the delete request. If so, then control returns to block 809. If not, then control flows to block 827.

At block 827, the storage manager updates the file group object to remove indications of the snapshot instance X. For example, the storage manager requests an object storage server to update the file group object. Since multiple file objects may be in a snapshot instance, the storage manager may request update of the file group object to remove indications of the file objects as they are deleted. But the storage manager waits until all of the file objects for a snapshot instance have been deleted to remove indication of the snapshot instance X. The storage manager returns the updated file group object to object storage. The storage manager can request update of the file group object after each update to a file object. In this example illustration, the storage manager waits until file objects for the delete request have finished processing, and then requests update of the file group object in object storage. In the meantime, the storage manager can update the file group object in working memory.

At block 828, the storage manager determines whether there is another file group object to process. If there is, then control returns to block 805. Otherwise, control continues to block 829. The storage manager can determine whether there is another file group object to process by determining all of the file group objects of the root file container object and tracking progress through the file group objects. In some embodiments, the storage manager can maintain a hierarchical representation of the file system in working memory (e.g., random access memory, non-volatile memory, etc.), and obtain file group objects and file objects as the storage manager traverses the hierarchical representation.

At block 829, the storage manager updates the root file container object to remove indication of the snapshot instance X. The storage manager waits until all file objects have been processed to update the root file container object to avoid inconsistency between the root file container object and the associated file group objects.

At block 830, the storage manager returns the updated root file container object to object storage. The storage manager can request update of the root file container object after each update to a file group object. In this example illustration, the storage manager waits until file group objects for the delete request have finished processing, and then requests update of the root file container object in object storage. In the meantime, the storage manager can update the root file container object in working memory. Block 829 is depicted in a dashed line since it may not be performed when updates are coalesced into a single request.

FIG. 9 is a flowchart of example operations for consolidating data objects for a delete snapshot request. For a delete snapshot request, the modifications of that snapshot instance to be deleted are consolidated or rolled up into a subsequent snapshot instance. Although FIG. 9 presumes consolidation into a more recent snapshot instance, a configuration can consolidate into an older, preceding snapshot instance. A system will request deletion of a snapshot instance to reduce the amount of storage consumed by snapshot instances and/or eliminate the number of snapshot instances presented via a user interface.

At block 901, a storage manager determines whether X, a snapshot instance requested to be deleted, is the most recent snapshot instance. The storage manager can determine age of a snapshot instance with metadata, a time stamp, the identifier of the snapshot instance, etc. If X is the most recent snapshot, then the modifications of the snapshot instance are being discarded. Those modifications will not be consolidated into a preceding snapshot instance. Of course, the storage manager can be configured to consolidate the most recent snapshot instance into a preceding snapshot instance instead of treating the request as a delete modifications request. For this example illustration, the delete most recent snapshot instance is handled by the storage manager as a delete modifications request and control returns to block 817 of FIG. 8. If the snapshot instance X is not the most recent snapshot, then control flows to block 903.

At block 903, the storage manager begins a loop of operations for each file block number indicated in the file object for snapshot instance X.

At block 905, the storage manager determines whether the file block number is indicated in snapshot instance X+1. If the snapshot instance X+1 indicates the file block number, then the file block number was modified and the modification in snapshot instance X is moot. If the snapshot instance X+1 indicates the file block number, then control flows to block 915. Otherwise, control flows to block 907.

Blocks 907, 909, and 913 are depicted within a dashed line. The dashed line indicates that mechanisms could be applied to the corresponding example operations to ensure the operations are carried out atomically. This may address possible inconsistencies that can arise if an interruption occurs (e.g., hardware failure).

At block 907, the storage manager updates the file object to indicate the file block numbers as part of the snapshot instance X+1. The updates to the file object are done in working memory of the storage manager until complete, although embodiments can push the individual updates into the object storage.

At block 909, the storage manager determines the <DATA OBJECT KEY, ELEMENT> pair for the file block number of the snapshot instance X. The storage manager determines the key from the file object.

At block 913, the storage manager updates the file object to indicate the <DATA OBJECT KEY, ELEMENT> pair for the file block number. For instance, the storage manager requests object storage to update the file object to indicate <FOO1_DATA2, 5> if the data object key is FOO1_DATA2 and the element of the data object corresponding to the file block number is identified or can be accessed with "5".

At block 915, the storage manager determines whether there is an additional file block number indicated in the file object for snapshot instance X. If not, then control flows to block 817 of FIG. 8. If there is an additional file block number indicated, then control returns to block 903 to proceed to the next indicated file block number.

The preceding Figures illustrate the efficiency of snapshot operations with a data layout in object storage as described. The efficiency facilitated by the data layout extends to other storage management operations, including deduplication. FIGS. 10-13 depict illustrations for deduplication with the data layout of objects in object storage that has previously been described. The example illustrations will focus on deduplication between an external non-object storage data source and an object storage. The example illustrations presume that data has already been heterogeneously replicated from the external non-object storage data source to object storage.

Figure 10:
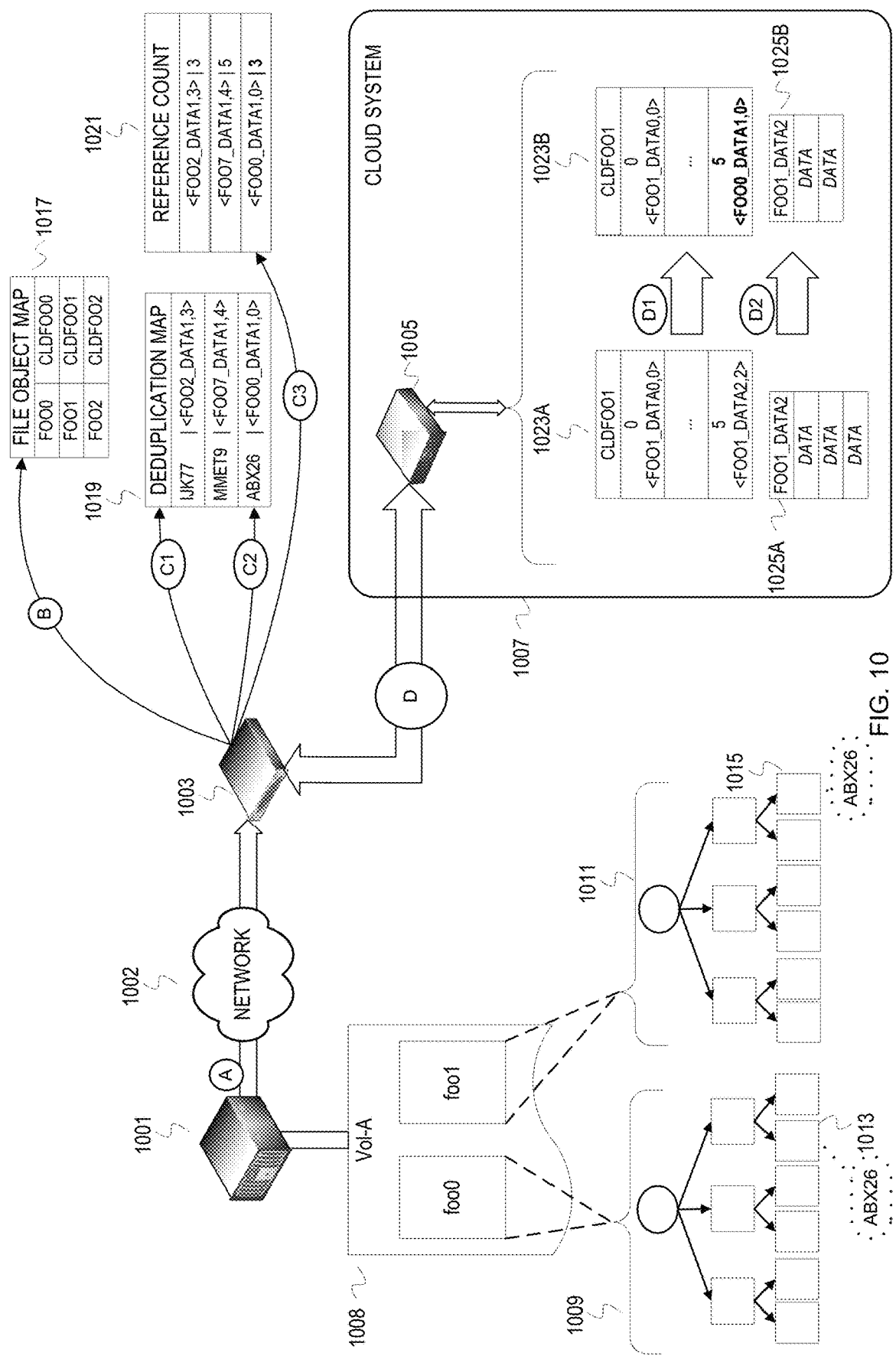
FIG. 10 is a conceptual diagram that illustrates an example deduplication between non-object storage and object storage.

FIG. 10 is a conceptual diagram that illustrates an example deduplication between non-object storage and object storage. FIG. 10 depicts a file server 1001, an intermediary device 1003, and an object storage server 1005. The file server 1001 provides access to data in a file system that includes a volume A 1008. The file server 1001 communicates with the intermediary device 1003 via a network 1002. The intermediary device 1003 can be a server or group of servers configured/programmed to mediate between a file server and an object storage server. The intermediary device 1003 communicates with the object storage server 1005 over a network that is not depicted. The object storage server 1005 provides access to objects and manages the objects.

In this example illustration, an organization is deduplicating data within object storage in a cloud system 1007 in accordance with deduplication that has already been done within the organization's non-object storage system. The cloud system 1007 includes numerous devices and program instances ("modules"), but only the object storage server 1005 is depicted in FIG. 10 to avoid overcomplicating the figure. High level operations for this deduplication are represented with a series of letters A-D. These letters represent stages of operations. Although these stages are ordered for this example, the stages illustrate one example to aid in understanding this disclosure and should not be used to limit the claims. Many of the operations represented by the stages in FIG. 10 will overlap. The stages illustrate interactions among actors and not necessarily order of the operations. Subject matter falling within the scope of the claims can vary with respect to the order and some of the operations.

In the storage space managed by the file server 1001, a file container 1008 ("Vol-A") includes two files: "foo0" and "foo1". Example inode structure 1009 and example inode structure 1011 correspond to the files foo0 and foo1, respectively. A file data block 1013 of the file foo0 and a file data block 1015 of the file foo1 have the same content/data. This duplication of data is expressed by the fingerprint "ABX26." A fingerprint is a value computed from data that identifies data with low risk of collision with different data. This fingerprint value is a random value chosen for simplicity to aid in explaining the figure. A fingerprint can be a hash value computed from data. A fingerprint is also referred to herein as a content based identifier, which is why the data of a file data block is referred to as content as well as data.

At stage A, the file server 1001 communicates with the intermediary device 1003 to request deduplication of the file data blocks 1013, 1015. The file server 1001 can send a request to the intermediary device 1003 that indicates the file data blocks 1013, 1015 and the fingerprint ABX26. The deduplication request also indicates the files foo0 and foo1 either with their filenames or file handles, depending upon which identifier was used in previous communications with object storage. Since the object storage has a flat namespace, the file server 1001 can request deduplication between files without indicating a file container.

At stage B, the intermediary device 1003 determines object keys based on the deduplication request. The intermediary device 1003 accesses a file object map 1017 to determine the object keys. With the file object map 1017, the intermediary device 1003 resolves the communicated file identifiers for files foo0 and foo1 to object keys CLDFOO0 and CLDFOO1, respectively.

At stages C1-C3, the intermediary device 1003 accesses and maintains deduplication data based on the deduplication request. At stage C1, the intermediary device 1003 accesses a deduplication map 1019 to determine whether the fingerprint ABX26 is indicated therein. For this illustration, the fingerprint is already indicated in the deduplication map 1019. At stage C2, the intermediary device 1003 determines that the fingerprint ABX26 is associated with the data block FOO0_DATA1. The data identified by the fingerprint ABX26 is at element 0 of the data block FOO0_DATA1. At stage C3, the intermediary device 1003 updates a reference counter structure 1021 to indicate three file objects refer to the data object element <FOO0_DATA1, 0>. One of the other file objects is CLDFOO0, the file object for the file foo0. Although depicted as occurring before stages D1-D2, stage C3 likely occurs prior to the D stages.

At stages D1-D2, the object storage server 1005 updates objects in object storage in accordance with the requested deduplication. At stage D1, the object storage server 1005 updates the file object CLDFOO1 to indicate <FOO0_DATA1, 0> for file block number 5 instead of <FOO1_DATA2, 2>. This presumes that file data block 1015 is identified as file block number 5 in the storage system managed by the file server 1001. At stage D2, the intermediary device 1003 updates the data object FOO1_DATA2 to delete (or mark for deletion) element "2", which is the third element because the numbering begins from 0.

Figure 11:
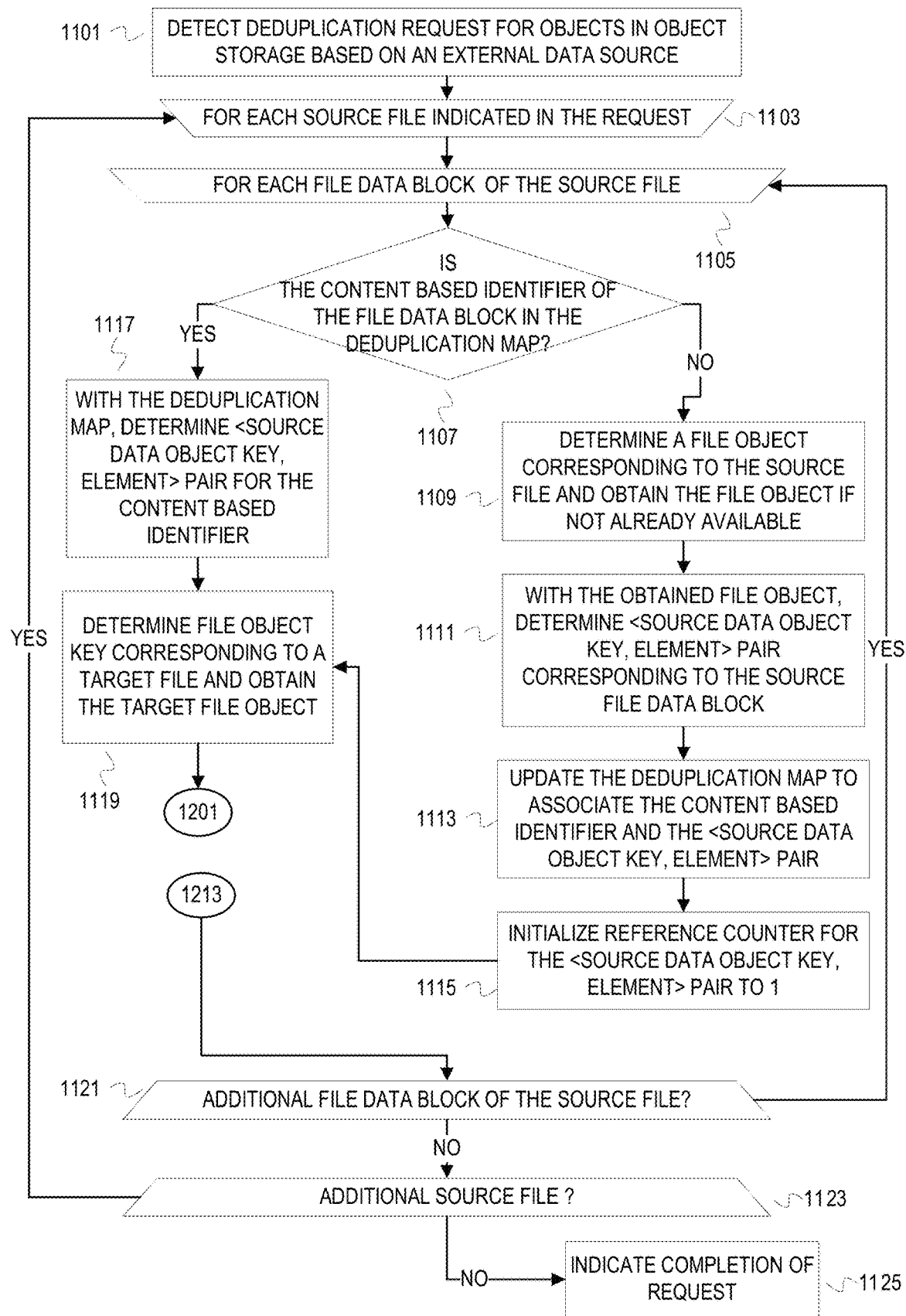
FIGS. 11-12 depict example operations for deduplication in object storage that represents non-object storage.
Figure 12:
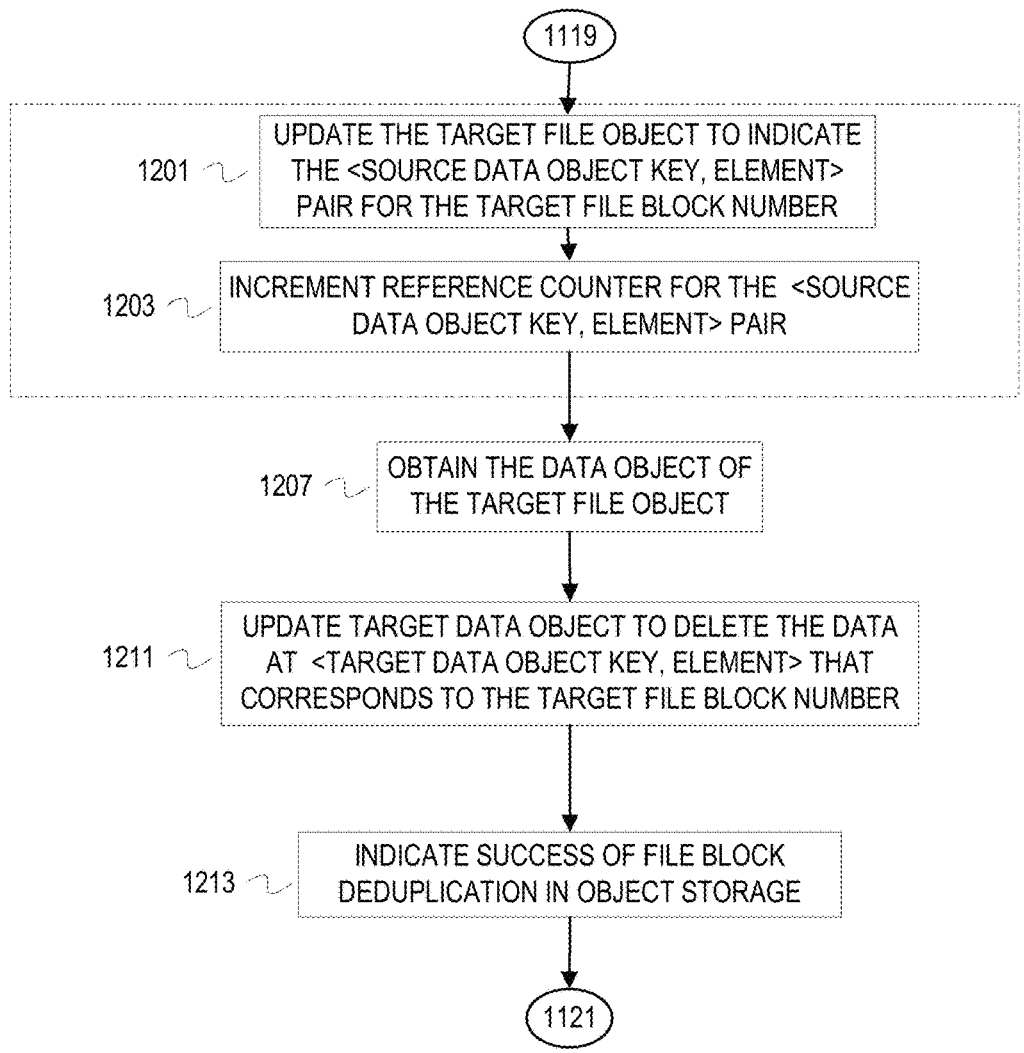

FIGS. 11-12 depict example operations for deduplication in object storage that represents non-object storage. FIGS. 11-12 refer to a storage manager as performing the represented operations.

At block 1101, a storage manager detects a deduplication request for objects in object storage based on an external data source. The storage manager can receive a deduplication request from an entity associated with a non-object storage system that was a source for a heterogeneous replication to the object storage. The deduplication request indicates at least two file data units of at least two different files for deduplication. The two file data units can be indicated with file name and file block number pairs, file name and file offset pairs, file handle and file block number pairs, etc. The deduplication request can also indicate multiple deduplication relationships. For a deduplication, at least one file is indicated as a source for the other file(s) for the deduplication. Designation of a source accounts for other files having already been deduplicated and referring to the deduplication source.

At block 1103, the storage manager begins a loop of operations for each source file indicated in the request.

At block 1105, the storage manager begins a nested loop of operations for each file data block of the source file indicated for the deduplication.

At block 1107, the storage manager determines whether the content based identifier of the file data block is already in a deduplication map. The deduplication map associates a content based identifier (e.g., a cryptographic digest, a Rabin fingerprint) with an indication of an object storage location of the data identified by the content based identifier. The deduplication map can be maintained in a database, in a data structure instantiated in working memory, etc. The storage manager can maintain the deduplication map in working memory. The working memory can be a non-volatile memory and/or the storage manager can periodically store the deduplication map into the object storage, the external non-object storage, or another location. If the content based identifier is already in the deduplication map, then control flows to block 1117. If not, then control flows to block 1109.

At block 1109, the storage manager determines a file object corresponding to the source file and obtains the determined file object, if not already available. The storage manager accesses data that maps file identifier to file object keys. The storage manager determines which file object key maps to the source file identifier. With the determined file object key, the storage manager requests the file object from object storage. The storage manager may have cached the object. If so, then the file object identified with the file object key may already be available to the storage manager.

At block 1111, the storage manager determines a <SOURCE DATA OBJECT KEY, ELEMENT> pair that corresponds to the file block number. The storage manager reads the obtained file object and determines the location information for the source file data block. For example, the storage manager reads the file object to determine a <SOURCE DATA OBJECT KEY, ELEMENT> pair indicated for a file block number that identifies the source file data block.

At block 1113, the storage manager updates the deduplication map to associate the content based identifier with the determined location information, which in this example is the <SOURCE DATA OBJECT KEY, ELEMENT> pair. The storage manager writes the content based identifier into the deduplication map since the request implicitly or explicitly indicates that corresponding data exists in object storage available for deduplication. For this illustration, the deduplication request implicitly indicates that data exists for deduplication because the request is generated after deduplication has been done in the external non-object storage source.

At block 1115, the storage manager initializes a reference counter for the <SOURCE DATA OBJECT KEY, ELEMENT> pair. The storage manager initializes a reference counter to indicate that the file object corresponding to the source file references the data at <SOURCE DATA OBJECT KEY, ELEMENT>. For example, the storage manager initializes the counter to 1. Control flows from block 1115 to block 1119.

If the storage manager determines that the deduplication map indicates the content based storage identifier (block 1107), then the storage manager determines the location information (e.g., <SOURCE DATA OBJECT KEY, ELEMENT> pair) associated with the content based identifier according to the deduplication map. The storage manager can query a database that hosts the deduplication map with the content based identifier, which is indicated in the deduplication request, and receive a response with the location information. The storage manager can traverse a deduplication map in working memory (e.g., hash table) that is indexed by the content based identifier and determine the associated location information.

At block 1119, the storage manager determines a file object key corresponding to a target file and obtains the target file object. The detected deduplication request indicates a target file for the deduplication, as well as the source file. The target file is the file that has the duplicate file data block. The storage manager accesses the file object map to resolve the target file identifier to the target file object key. With the file object key, the storage manager requests the target file object from object storage. Control flows from block 1119 to block 1201 of FIG. 12.

FIG. 12 depicts example operations for updating file objects for deduplication, continuing from FIG. 1. A dashed box around blocks 1201 and 1203 indicates that a mechanism can be applied to ensure atomicity of the represented operations.

At block 1201, the storage manager updates the target file object to indicate the location information of the data in object storage. For example, the storage manager submits an update request to object storage to update the target file object. In this illustration, the storage manager updates the target file object to indicate the <SOURCE DATA OBJECT KEY, ELEMENT> pair. The storage manager updates the target file object to indicate this location information for a target file block number that identifies the duplicate file data in the target file. The file block number in the target file is independent of the file block number in the source file despite data duplication. The detected deduplication request indicates the target file block number, as well as the source file block number.

At block 1203, the storage manager increments a reference counter for the location corresponding to the content based identifier. In this illustration, the storage manager increments the references counter for the <SOURCE DATA OBJECT KEY, ELEMENT> pair. The reference counter is used to ensure that the data at <SOURCE DATA OBJECT KEY, ELEMENT> is not deleted while still replied upon by a file object in object storage.

At block 1207, the storage manager obtains the data object of the target file object. The storage manager already obtained the target file object, and determines the key for the data object of the target file object ("target data object") with the obtained target file object.

At block 1211, the storage manager updates the target data object to delete the data at the location in the target data object that corresponds to the target file block number. For example, the storage manager requests object storage to delete data at <TARGET DATA OBJECT KEY, ELEMENT>. The object storage can implement deletion differently. The object storage can delete or mark for deletion the data in accordance with the request.

At block 1213, the storage manager indicates success of deduplication of the file block in object storage. The storage manager can maintain an indication of success per each file block and then generate a notification when all of the file blocks have been successfully deleted (or marked for deletion). Control flows from block 1213 to block 1121 of FIG. 11.

At block 1121, the storage manager determines whether there is an additional file data block of the source file for deduplication. If there is another file data block of the source file for deduplication, then control flows back to block 1105. If there is no additional file data block of the source file for deduplication, then control flows to block 1123.

At block 1123, the storage manager determines whether there is an additional source file for deduplication. If there is another source file for deduplication, then control flows back to block 1103. If there is no additional source file for deduplication, then control flows to block 1125.

At block 1125, the storage manager indicates completion of the deduplication request.

Since multiple file objects indicate a data object with deduplicated data, data deletion or requested data deletion varies with deduplicated data. While multiple file objects indicate the deduplicated data, deletion or requested deletion involves maintenance of the deduplication reference counter and metadata in the file objects. The deduplicated data can be deleted or marked for deletion when the reference counter falls to zero.

Figure 13:
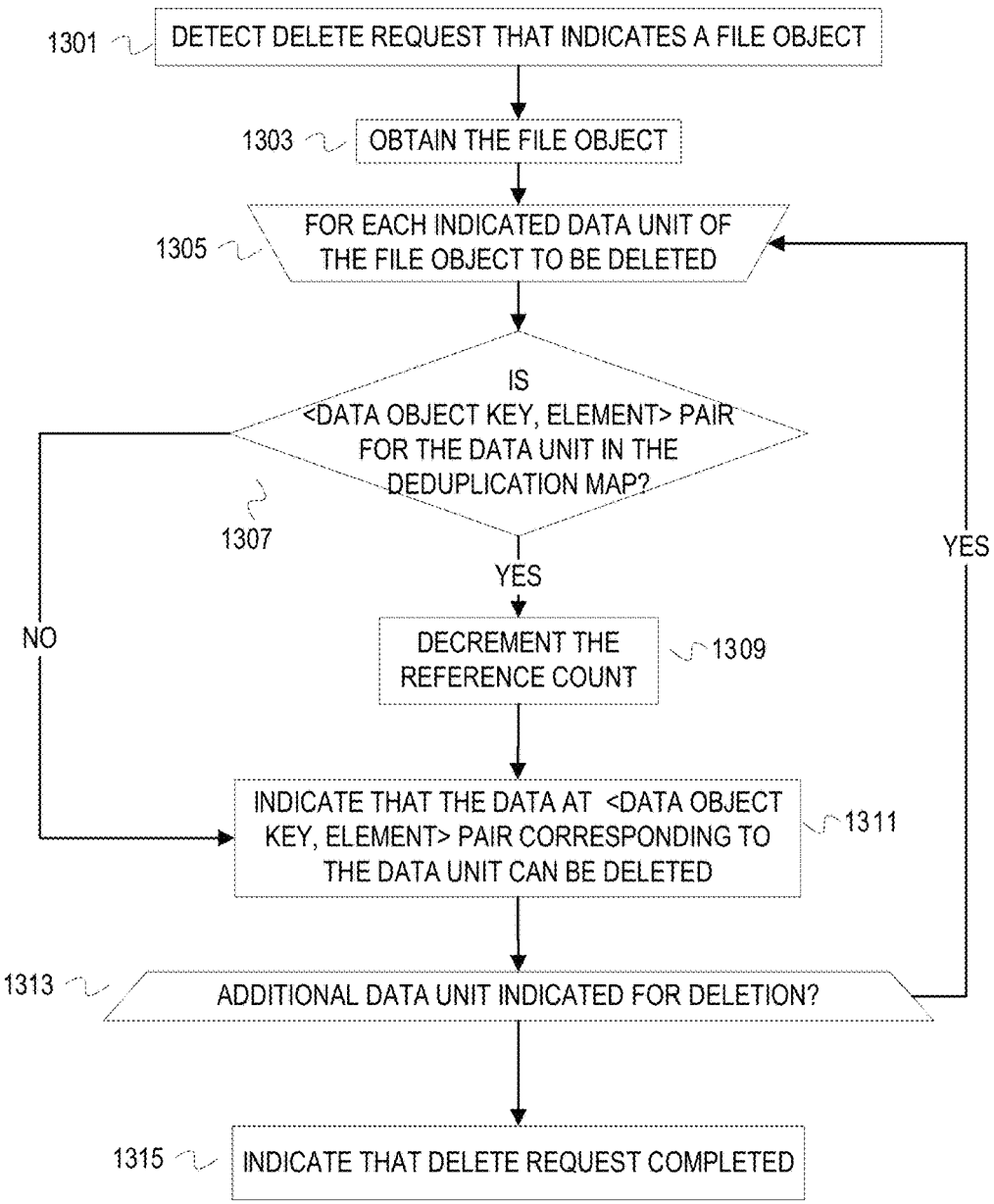
FIG. 13 is a flowchart of example operations for servicing a deletion request that involves deduplicated data in object storage.

FIG. 13 is a flowchart of example operations for servicing a deletion request that involves deduplicated data in object storage. FIG. 13 refers to a storage manager as performing the example operations.

At block 1301, a storage manager detects a delete request that indicates a file object. The storage manager may receive the delete request from a device of an external non-object storage system, a device of an object storage system, an administrator account, etc. The delete request at least indicates a file object key and a file data unit. For example, the delete request can indicate a file object key and a file block number. A delete request can also indicate a data object key and location information of data to be deleted within a corresponding data object. For example, the delete request can indicate the data object key and an element identifier based on how the data object is implemented (e.g., an index into the data object). The delete request can indicate multiple data units for deletion.

At block 1303, the storage manager obtains the file object. The storage manager requests from object storage the file object identified by the file object key indicated in the delete request.

At block 1305, the storage manager begins a loop of operations for each file data unit of the obtained file object indicated in the delete request. If the data corresponds to data from a non-object storage system, for example a file level storage system, the request can indicate file block numbers.

At block 1307, the storage manager determines whether location information for the data unit is indicated in the deduplication map. For example, the storage manager determines whether a <DATA OBJECT KEY, ELEMENT> pair corresponding to the file data unit is in the deduplication map. The storage manager determines the <DATA OBJECT KEY, ELEMENT> pair from the obtained file object, if not indicated in the delete request. As stated earlier, the delete request indicates a data unit (e.g., file block number). The storage manager determines the <DATA OBJECT KEY, ELEMENT> pair from the obtained file object, which indicates location of each file data unit of the file data object. If location of the file data unit is indicated in the deduplication map, then control flows to block 1309. Otherwise, control flows to block 1311.

At block 1309, the storage manager decrements a reference counter for the location of the file data unit requested to be deleted. A separate process can later traverse the reference counter information and delete or mark for deletion those entries with a 0 for a reference counter.

At block 1311, the storage manager indicates that the data at the indicated location of the data unit requested to be deleted can be deleted. For example, the storage manager indicates that the data at <DATA OBJECT KEY, ELEMENT> can be deleted. The storage manager can communicate this indication for each data unit requested to be deleted, after n>1 data units have been processed, after all data units of a file object have been processed, etc. Indicating that the data unit can be deleted can be performed differently. The storage manager can write a delete indication into an element of a data object without modifying the content of the data object element. The storage manager can overwrite the content of a data object element to indicate that the data object element can be released or freed. The storage manager can update a structure that tracks data units available for object clean-up.

At block 1313, the storage manager determines whether there is an additional data unit indicated for deletion. If so, then control returns to block 1305 for the additional data unit. If there is no other data unit indicated for deletion, then control continues to block 1315.

At block 1315, the storage manager indicates that the delete request has been completed. The storage manager can transmit a notification of the completion to a requestor or an entity identified in the delete request.

Variations

Although the example illustrations refer to requests originating from an external non-object storage and heterogeneous replication from an external non-object storage into object storage, embodiments are not limited to these examples. The cloud object data layout that facilitates efficient storage management in object storage can be used for inter-object storage system or intra-object storage system operations. A storage manager can request a snapshot of data that is independent of an external non-object storage system. The snapshot information can be maintained as depicted in the example illustrations, perhaps without indications of file block numbers since those are artifacts of file level storage. Instead of a mapping between file names and object keys, the storage manager can maintain a mapping between object keys of primary data objects and secondary data objects. Similarly, embodiments are not limited to deduplication between an external non-object storage and object storage. An object storage system can perform deduplication without a source external non-object storage. When creating data objects, the storage manager can create fingerprints for the data to determine when deduplication can be performed. In addition, a first object storage system can deduplicate data and request the propagation of that deduplication into a second object storage system.

The example illustrations focus on snapshotting and deduplication for examples of storage management operations. But other storage management operations can be performed with the described cloud object data layout. For instance, file cloning and compression can be performed. When cloning is requested for a file, the corresponding objects are created and/or maintained. A storage manager will request creation of a file object and data objects. The storage manager will update a file group object to indicate the file objects and update the file object to indicate the data objects. For compression, a storage manager can compress data when a data object is created. Referring to FIG. 2, a storage manager can compress the data when adding data elements as mentioned at block 221. The storage manager can compress each element as it is added to the data object. This would allow for a granularity of access at the element level. The storage manager could insert indications into the data that identifies individual data units instead of relying structural separation, and compress all of the data including the indications of individual data units. This allows for efficient storage of the data as a whole, and allows for individual manipulation after decompression.

The illustration in FIG. 10 depicts a flowchart for example post-process deduplication. Embodiments can also perform in-line deduplication between a file system and object storage. When a storage manager receives data requested for storage, the storage manager can compute the fingerprint of that data and determine whether the data is already represented in object storage using a fingerprint database. In that case, the storage manager can determine the data object key from the fingerprint database and update a file object corresponding to a file indicated in the request. In addition, the storage manager does not necessarily compute the fingerprint. The storage manager can receive a deduplication request that includes a computed fingerprint and associated data from the external data source.

The examples often refer to a "storage manager." The storage manager is a construct used to refer to implementation of functionality for storage management. This construct is utilized since numerous implementations are possible. A storage manager may be a particular component or components of a machine (e.g., a particular circuit card enclosed in a housing with other circuit cards/boards), machine-executable program or programs, firmware, a circuit card with circuitry configured and programmed with firmware for storage management, etc. The term is used to efficiently explain content of the disclosure. The storage manager can also be part of an operating system, programmed as a virtual machine or part of a virtual machine, etc. Although the examples refer to operations being performed by a storage manager, different entities can perform different operations. For instance, a dedicated co-processor or application specific integrated circuit can be programmed to perform or execute program instructions for storage management operations.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. Loops in the flowcharts do not necessarily run to completion. A loop of operations can be terminated prematurely due to various reasons (e.g., resource constraints, performance issues, manual termination, etc.). Referring to FIG. 4, blocks 403 and 405 may be performed depending upon a query or browse type of operation via a user interface. A user can query a user interface for information about snapshot instances for a particular file container replicated into object storage. The user interface requests a root file container object to determine the snapshot instances that exist for the root file container object. Referring to FIG. 13, additional operations can be performed to delete or mark for deletion a data unit for which a reference counter has been decremented to 0 at block 1309. In addition, additional operations can be performed to process multiple file objects if a delete request indicates data units of multiple file objects. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium does not include transitory signals.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 14:
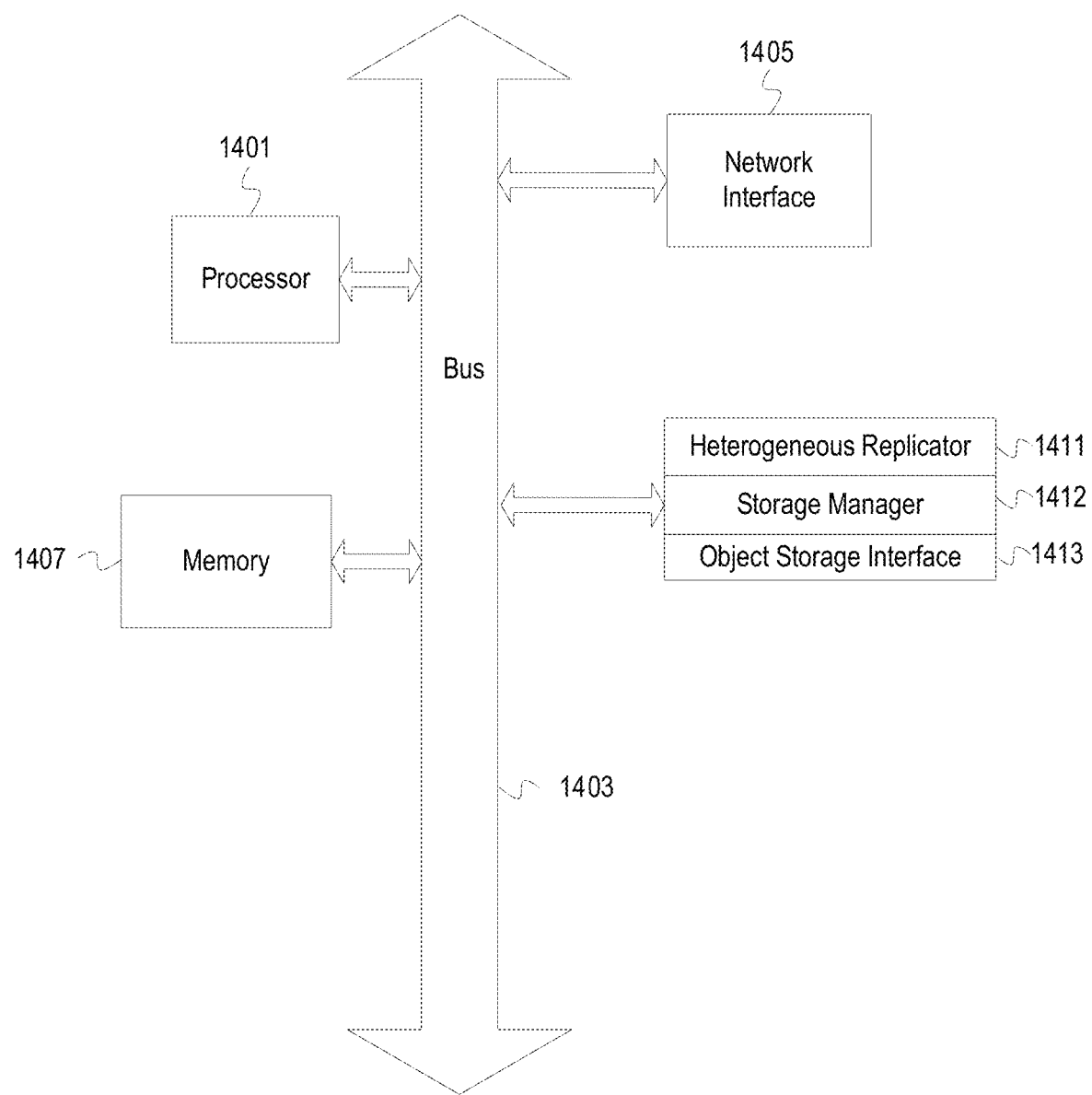
FIG. 14 depicts an example computer system with a stack of modules that create and maintain objects that facilitate efficient storage management of object storage.

FIG. 14 depicts an example computer system with a stack of modules that create and maintain objects that facilitate efficient storage management of object storage. The computer system includes a processor unit 1401 (possibly including multiple processors, multiple cores, multiple nodes, and/or implementing multi-threading, etc.). The computer system includes memory 1407. The memory 1407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 1403 (e.g., PCI, ISA, PCI-Express, HyperTransport® bus, InfiniBand® bus, NuBus, etc.) and a network interface 1405 (e.g., a Fiber Channel interface, an Ethernet interface, an internet small computer system interface, SONET interface, wireless interface, etc.). The system also includes a stack of modules includes a heterogeneous replicator 1411, a storage manager 1412, and an object storage interface 1413. These modules are referred to as being in a "stack" to express the interaction among the modules. The heterogeneous replicator 1411 maintains mappings of file identifiers in non-object storage to object keys in object storage. The heterogeneous replicator 1411 submits various requests to create, update, delete, etc., objects to the object storage interface 1413. The storage manager 1412 detects requests for storage management operations, such as snapshot and deduplicate. The storage manager 1412 maintains data for some of storage management operations (e.g., a deduplication map) and submits requests to the object storage interface. The object storage interface 1413 generates requests (e.g., PUT, GET, UPDATE, etc.) to carry out requests from the heterogeneous replicator 14111 and the storage manager 1412. The depicted computer system of FIG. 14 could also include a block level storage module and/or file level storage module that generates requests to the heterogeneous replicator 1411 or storage manager 1412. Any one of the previously described functionalities may be partially (or entirely) implemented in hardware and/or on the processing unit 1401. For example, the functionality may be implemented with an application specific integrated circuit, in logic implemented in the processing unit 1401, in a co-processor on a peripheral device or card, etc. Further, realizations may include fewer or additional components not illustrated in FIG. 14 (e.g., video cards, audio cards, additional network interfaces, peripheral devices, etc.). The processor unit 1401 and the network interface 1405 are coupled to the bus 1403. Although illustrated as being coupled to the bus 1403, the memory 1407 may be coupled to the processor unit 1401.

While the aspects of the disclosure are described with reference to various implementations and exploitations, it will be understood that these aspects are illustrative and that the scope of the claims is not limited to them. In general, techniques for laying out data in object storage for efficient storage management operations as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

What is claimed is:

1. A method, comprising:
   creating, by a computing device, a first metadata object and a data object in an object based storage system, wherein the data object comprises a copy of data of a first file that is stored in a file system hosted by a non-object based storage system and the copy of the data is stored in elements of the data object that preserve organizational correspondence of the copy of the data with file data blocks that constitute the first file; and
   inserting, by the computing device, a metadata pair for each of the elements into the first metadata object, wherein each of the metadata pairs comprises a key for the data object and an element identifier for one of the elements and each of the element identifiers comprises a file block number for a corresponding one of the file data blocks.

2. The method of claim 1, further comprising repeating, by the computing device, the creation and insertion for each of a first plurality of files from the file system in response to detecting a request to replicate the file system into the object based storage system.

3. The method of claim 2, further comprising creating, by the computing device, a third metadata object in the object based storage system that indicates a plurality of metadata objects for a second plurality of files, wherein a second metadata object, indicating the plurality of metadata objects, and the third metadata object represent directories from the file system.

4. The method claim 2, further comprising updating, by the computing device, the first metadata object of a second file of the first plurality of files to indicate a second data object created in the object based storage system with modified data determined at another file data block of the second file.

5. The method of claim 4, further comprising indicating, by the computing device, another key for the second data object and a location within the second data object at which the modified data for the another file data block can be accessed, wherein the first metadata object also references the second data object for at least a second file data block of the second file.

6. The method of claim 3, further comprising updating, by the computing device, the second metadata object to indicate a snapshot instance and objects that represent files modified during the snapshot instance and associated with a file container represented by the second metadata object.

7. One or more non-transitory machine-readable media having stored thereon instructions for improved object data layout comprising machine executable code that, when executed by at least one machine, causes the machine to:
   create a first metadata object and a data object in an object based storage system, wherein the data object comprises a copy of data of a first file that is stored in a file system hosted by a non-object based storage system and the copy of the data is stored in elements of the data object that preserve organizational correspondence of the copy of the data with file data blocks that constitute the first file; and
   insert a metadata pair for each of the elements into the first metadata object, wherein each of the metadata pairs comprises a key for the data object and an element identifier for one of the elements and each of the element identifiers comprises a file block number for a corresponding one of the file data blocks.

8. The non-transitory machine-readable media of claim 7, wherein the machine executable code, when executed by the machine, further causes the machine to repeat the creation and insertion for each of a first plurality of files from the file system in response to detecting a request to replicate the file system into the object based storage system.

9. The non-transitory machine-readable media of claim 8, wherein the machine executable code, when executed by the machine, further causes the machine to create a third metadata object in the object based storage system that indicates a plurality of metadata objects for a second plurality of files, wherein a second metadata object, indicating the plurality of metadata objects, and the third metadata object represent directories from the file system.

10. The non-transitory machine-readable media of claim 8, wherein the machine executable code, when executed by the machine, further causes the machine to update the first metadata object of a second file of the first plurality of files to indicate a second data object created in the object based storage system with modified data determined at another file data block of the second file.

11. The non-transitory machine-readable media of claim 10, wherein the machine executable code, when executed by the machine, further causes the machine to indicate another key for the second data object and a location within the second data object at which the modified data for the another file data block can be accessed, wherein the first metadata object also references the second data object for at least a second file data block of the second file.

12. The non-transitory machine-readable media of claim 9, wherein the machine executable code, when executed by the machine, further causes the machine to update the second metadata object to indicate a snapshot instance and objects that represent files modified during the snapshot instance and associated with a file container represented by the second metadata object.

13. An apparatus comprising:
   a memory containing machine readable medium comprising machine executable code having stored thereon instructions for improved object data layout; and a processor coupled to the memory, the processor configured to execute the machine executable code to cause the processor to:

create a first metadata object and a data object in an object based storage system, wherein the data object comprises a copy of data of a first file that is stored in a file system hosted by a non-object based storage system and the copy of the data is stored in elements of the data object that preserve organizational correspondence of the copy of the data with file data blocks that constitute the first file; and insert a metadata pair for each of the elements into the first metadata object, wherein each of the metadata pairs comprises a key for the data object and an element identifier for one of the elements and each of the element identifiers comprises a file block number for a corresponding one of the file data blocks.

14. The apparatus of claim 13, wherein the processor is further configured to execute the machine executable code to further cause the processor to repeat the creating the creation and insertion for each of a first plurality of files from the file system in response to detecting a request to replicate the file system into the object based storage system.

15. The apparatus of claim 14, wherein the processor is further configured to execute the machine executable code to further cause the processor to create a third metadata object in the object based storage system that indicates a plurality of metadata objects for a second plurality of files, wherein a second metadata object, indicating the plurality of metadata objects, and the third metadata object represent directories from the file system.

16. The apparatus of claim 14, wherein the processor is further configured to execute the machine executable code to further cause the processor to update the first metadata object of a second file of the first plurality of files to indicate second data object created in the object based storage system with modified data determined at another file data block of the second file.

17. The apparatus of claim 16, wherein the processor is further configured to execute the machine executable code to further cause the processor to indicate another key for the second data object and a location within the second data object at which the modified data for the another file data block can be accessed, wherein the first metadata object also references the second data object for at least a second file data block of the second file.

18. The apparatus of claim 15, wherein the processor is further configured to execute the machine executable code to further cause the processor to updating the second metadata object to indicate a snapshot instance and objects that represent files modified during the snapshot instance and associated with a file container represented by the second metadata object.

* * * * *